United States Patent
Moki et al.

(10) Patent No.: US 9,166,415 B2
(45) Date of Patent: Oct. 20, 2015

(54) AC LINK BIDIRECTIONAL DC-DC CONVERTER, HYBRID POWER SUPPLY SYSTEM USING THE SAME AND HYBRID VEHICLE

(75) Inventors: Atsushi Moki, Hiratsuka (JP); Katsuji Iida, Hiratsuka (JP)

(73) Assignee: Komatsu Ltd., Minato-Ku, Tokyo (JP)

( * ) Notice: Subject to any disclaimer, the term of this patent is extended or adjusted under 35 U.S.C. 154(b) by 1385 days.

(21) Appl. No.: 12/085,151

(22) PCT Filed: Nov. 22, 2006

(86) PCT No.: PCT/JP2006/323336
§ 371 (c)(1),
(2), (4) Date: May 15, 2008

(87) PCT Pub. No.: WO2007/060998
PCT Pub. Date: May 31, 2007

(65) Prior Publication Data
US 2009/0171521 A1 Jul. 2, 2009

(30) Foreign Application Priority Data
Nov. 24, 2005 (JP) ................................. 2005-338682

(51) Int. Cl.
*B60L 11/00* (2006.01)
*H02J 7/00* (2006.01)
*B60L 11/18* (2006.01)
*H02M 3/335* (2006.01)
*H02J 7/34* (2006.01)

(52) U.S. Cl.
CPC .............. *H02J 7/0016* (2013.01); *B60L 11/18* (2013.01); *H02M 3/33584* (2013.01); *B60L 2210/10* (2013.01); *B60L 2210/20* (2013.01); *H02J 7/345* (2013.01); *Y02T 10/7005* (2013.01); *Y02T 10/7055* (2013.01); *Y02T 10/725* (2013.01); *Y02T 10/7216* (2013.01)

(58) Field of Classification Search
CPC combination set(s) only.
See application file for complete search history.

(56) References Cited

U.S. PATENT DOCUMENTS

| 4,462,070 | A | * | 7/1984 | Iida .................................. 363/28 |
| 5,027,264 | A | * | 6/1991 | DeDoncker et al. ............ 363/16 |
| 5,255,174 | A | * | 10/1993 | Murugan ......................... 363/17 |
| 5,355,025 | A | * | 10/1994 | Moran et al. .................. 307/105 |
| 5,359,275 | A | * | 10/1994 | Edwards ........................ 323/207 |
| 5,373,195 | A | * | 12/1994 | De Doncker et al. ........... 307/45 |

(Continued)

FOREIGN PATENT DOCUMENTS

| CN | 1082265 A | 2/1991 |
| CN | 1558539 A | 12/2004 |

(Continued)

OTHER PUBLICATIONS

International Search Report related to PCT/JP2006/323336.
(Continued)

*Primary Examiner* — Jonathan L Sample
(74) *Attorney, Agent, or Firm* — Husch Blackwell, LLP

(57) ABSTRACT

In an AC link type boosting device, DC terminals of two voltage inverters are connected each other in series in additive polarity and plural AC terminals of each of the voltage inverters are connected to a transformer. The two voltage type inverters are AC linked to each other via the transformer. An external voltage applied between the DC terminals of the AC link type booster is divided by the voltage-type inverters.

48 Claims, 13 Drawing Sheets

(56) References Cited

U.S. PATENT DOCUMENTS

| | | | |
|---|---|---|---|
| 5,546,295 A * | 8/1996 | Prete et al. | 363/17 |
| 5,594,632 A * | 1/1997 | Barrett | 363/44 |
| 5,771,161 A * | 6/1998 | Jackson et al. | 363/40 |
| 6,128,204 A * | 10/2000 | Munro et al. | 363/41 |
| 6,229,722 B1 * | 5/2001 | Ichikawa et al. | 363/71 |
| 6,335,871 B1 * | 1/2002 | Kita et al. | 363/35 |
| 6,429,612 B1 * | 8/2002 | Kume et al. | 318/139 |
| 6,704,213 B2 * | 3/2004 | Steimer | 363/61 |
| 6,795,322 B2 * | 9/2004 | Aihara et al. | 363/37 |
| 7,499,290 B1 * | 3/2009 | Mazzola et al. | 363/17 |
| 7,638,904 B2 * | 12/2009 | Shoji et al. | 307/154 |
| 7,740,092 B2 * | 6/2010 | Bender | 180/65.29 |
| 2002/0101747 A1 * | 8/2002 | Falk et al. | 363/71 |
| 2002/0158606 A1 * | 10/2002 | King | 320/125 |
| 2002/0172062 A1 * | 11/2002 | Furukawa et al. | 363/132 |
| 2003/0012038 A1 * | 1/2003 | Welches et al. | 363/34 |
| 2003/0048651 A1 * | 3/2003 | Trimble et al. | 363/125 |
| 2004/0021323 A1 * | 2/2004 | Lee | 290/40 C |
| 2006/0066283 A1 * | 3/2006 | Ota et al. | 318/803 |
| 2006/0125319 A1 * | 6/2006 | King et al. | 307/10.1 |
| 2006/0139823 A1 * | 6/2006 | Shoji et al. | 361/56 |
| 2006/0250105 A1 * | 11/2006 | Jadric et al. | 318/701 |
| 2007/0025125 A1 * | 2/2007 | Nakahori et al. | 363/56.02 |
| 2009/0171521 A1 * | 7/2009 | Moki et al. | 701/22 |
| 2010/0020576 A1 * | 1/2010 | Falk | 363/55 |

FOREIGN PATENT DOCUMENTS

| | | |
|---|---|---|
| CN | 1571254 A | 1/2005 |
| DE | 4422409 C2 | 7/1996 |
| JP | 06-217553 | 8/1994 |
| JP | 1146566 | 5/1999 |
| JP | 2001-044045 | 2/2001 |
| JP | 2002-223565 | 8/2002 |
| JP | 2003-047245 | 2/2003 |
| JP | 2005-224012 | 8/2005 |
| WO | WO0215363 A2 | 2/2002 |

OTHER PUBLICATIONS

Office Action for related German Patent Application dated May 26, 2009 and translation.

Office Action for related Chinese Patent Application dated Aug. 3, 2010 and translation.

Office Action for related Japanese Patent Application dated Apr. 26, 2011 and translation.

* cited by examiner

AC LINK BIDIRECTIONAL DC-DC CONVERTER, HYBRID POWER SUPPLY SYSTEM USING THE SAME AND HYBRID VEHICLE

TECHNICAL FIELD

The present invention relates to an AC link bidirectional DC-DC converter, a hybrid power supply system using the same and a hybrid vehicle.

BACKGROUND ART

In electric automobiles, the load on electrically driven devices such as a motor varies considerably and frequently at startup and during acceleration, deceleration and hill climbing. Therefore, batteries mounted in the electric automobiles for driving electrically driven devices are apt to have smaller capacity and shorter life in comparison with those used under constant load.

In order to overcome these disadvantages, Patent Document 1 to be described below proposes a power supply device for use in electric automobiles, which is formed by combination of a battery for main power supply, and a battery or capacitor for auxiliary power supply, so that the auxiliary power supply bears the substantial, rapid and frequent variation in the load on the electrically driven device, whereby the variation in the load on the battery for main power supply is minimized.

The power supply system as described above is capable of collecting kinetic energy generated by the electrically driven device during deceleration and braking, in the auxiliary power supply as electric power, and supplying the collected electric power to the electrically driven device if required. The operation to collect electric power from the electrically driven device into the auxiliary power supply is referred to as a regeneration mode, and the operation to supply electric power from the auxiliary power supply to the electrically driven device is referred to as a motoring mode. A power supply system performing these operations is referred to as a hybrid power supply system. An electric automobile having such a hybrid power supply system mounted thereon is referred to as a hybrid vehicle.

FIG. 12 is a diagram for explaining a typical conventional hybrid power supply system for use in electric automobiles.

In FIG. 12, a hybrid power supply system 1 is formed by a main power supply 10, an electrically driven device 20, and an auxiliary power supply 30.

The main power supply 10 is composed of an engine 11, an electric generator 12, and an inverter 13. The electrically driven device 20 is composed of an inverter 21 and a motor 22. The inverter 13 and the inverter 21 are connected to each other through a positive line 14 and a negative line 15. A voltage V0 is applied between the positive line 14 and the negative line 15. In the following description, the section formed of the main power supply 10, the electrically driven device 20, and the positive and negative lines 14, 15 will be referred to simply as the main power supply 10 unless there is danger of misunderstanding.

The auxiliary power supply 30 is composed of a bidirectional boosting chopper 31 and an energy accumulation device 32 (hereafter, referred as the battery 32). The term "bidirectional" as used in the present invention means that electric power is reversibly transmitted from the auxiliary power supply 30 to the main power supply 10, or from the main power supply 10 to the auxiliary power supply 30, through the positive and negative lines 14, 15.

The bidirectional boosting chopper 31 is composed of two semiconductor switching elements S1, S2 and an inductor 35 having an inductance L. The semiconductor switching elements S1, S2 are each formed by an IGBT and an antiparallel diode connected in parallel as an internal or external element. For convenience of following description, the IGBT is denoted by Tr, and the antiparallel diode is denoted by D. For example, the reference symbol Tr1 means the IGBT of the semiconductor switching element S1, and D1 means the antiparallel diode of the semiconductor switching element S1.

The semiconductor switching elements S1, S2 are connected in series at a connecting point a, and one end of the inductor 35 is connected to the connecting point a. A negative terminal b of the semiconductor switching element S1 is connected to the negative line 15, and a positive terminal c of the semiconductor switching element S2 is connected to the positive line 14. The positive terminal of the battery 32 is connected to the other end of the inductor 35, and the negative terminal of the battery 32 is connected to the negative line 15. This means that the battery 32 and the main power supply 10 are connected in parallel while polarities thereof being matched.

The bidirectional boosting chopper 31 temporarily accumulates electric power of the battery 32 in the inductor 35, and the accumulated electric power can be transmitted to the main power supply 10. Conversely, the electric power in the main power supply 10 can be transmitted to the battery 32.

In electric automobiles, the voltage V0 in the main power supply 10 is generally maintained at a high voltage around 600V. On the other hand, the voltage V1 of the battery 32 in the auxiliary power supply 30 is a low voltage around 300V. Maximum current flowing through the bidirectional boosting chopper 31 is of about 600 A (when the battery voltage is 300V, the transmission electric power is 120 kW, and the ripple rate is 50%).

According to the hybrid power supply system 1 as described above, in the regeneration mode, the kinetic energy of the main power supply 10 can be converted to low-voltage electric power and charged in the battery 32 of the auxiliary power supply 30. In the motoring mode, the electric power accumulated in the battery 32 of the auxiliary power supply 30 can be converted to high-voltage electric power and supplied to the main power supply 10.

This means that, according to the hybrid power supply system 1, even if the load on the electrically driven device 20 varies considerably, rapidly, and frequently, electric power can be supplied from the auxiliary power supply 30 to supplement the electric power capacity of the main power supply 10. This makes it possible to drive the electrically driven device 20 efficiently in a constant high voltage range.

However, the hybrid power supply system 1 has four problems as described below.

(1) High Element Voltage Rating

The semiconductor switching elements S1, S2 used in the bidirectional boosting chopper 31 have high voltage rating. When the main power supply 10 has a voltage V0 of about 600V, the semiconductor switching elements S1, S2 should have a rating of 1200V to ensure safety.

(2) High Element Current Rating

Electric current (with a peak value of about 600 A) from the battery 32 flows through the respective IGBTs and antiparallel diodes of the semiconductor switching elements S1, S2 of the bidirectional boosting chopper 31. Therefore, the semiconductor switching elements S1, S2 are required to have a high current rating of about 600 A. This makes the size of the inductor 35 large.

(3) High Electric Power Loss

Turn-on power loss and reverse recovery loss of the antiparallel diode will occur since employed is hard switching in which the IGBT of one of the semiconductor switch elements S1, S2 used in the bidirectional boosting chopper 31 is turned on in the condition where the antiparallel diode of the other semiconductor switching element is conductive. Further, the semiconductor switch elements with a high voltage rating will suffer high conduction power loss and high switching power loss, causing deterioration of the electric power conversion efficiency, also due to the high voltage in the inverter circuit.

(4) Difficulty in Size Reduction and Cost Reduction

The electric current flowing through the inductor 35 is direct current, which uses only a half of the B-H curve of an iron core. Further, since the direct current flowing through the inductor 35 is excitation current itself, a core gap is required. This requires increase of the core cross-sectional area in order to obtain high inductance.

Cores with a large core cross-sectional area are expensive and difficult to reduce the size or weight. In order to solve this problem, hybrid power supply systems are known in which magnetic parts are AC-driven.

FIG. 13 is a diagram showing a hybrid power supply system employing an AC link bidirectional DC-DC converter.

In FIG. 13, a hybrid power supply system 2 is formed by a main power supply 10 (with a voltage V0 of about 600V) and an auxiliary power supply 40. The auxiliary power supply 40 is composed of an AC link bidirectional DC-DC converter 44 in which an inverter 41 and an inverter 42 are linked to each other by a transformer 43 (herein with a winding ratio of 1:2), and an energy accumulation device 46 (hereafter explained as the capacitor 46 with a rated voltage V1 of 300V).

The inverter 41 comprises four semiconductor switching elements S1, S1, S2, S2. The semiconductor switching elements are each formed by an IGBT and an antiparallel diode like those in FIG. 12.

The semiconductor switching element pair (S1, S2) located on the left side of the inverter 41 in FIG. 13 are connected in series to each other. The positive terminal of the semiconductor switching element S1 being connected to the positive terminal of the capacitor 46, and the negative terminal of the semiconductor switching element S2 is connected to the negative terminal of the capacitor 46.

On the other hand, the semiconductor switching element pair (S2, S1) located on the right side are connected in series to each other. The positive terminal of the semiconductor switching element S2 is connected to the positive terminal of the capacitor 46, and the negative terminal of the semiconductor switching element S1 is connected to the negative terminal of the capacitor 46.

The semiconductor switching element pair (S1, S1) and the semiconductor switching element pair (S2, S2) are turned on and off alternately.

Like the inverter 41, the inverter 42 comprises four semiconductor switching elements S21, S21, S22, S22. The semiconductor switching elements are each formed by an IGBT and an antiparallel diode like those in FIG. 12.

The semiconductor switching element pair (S21, S22) located on the left side in FIG. 13 are connected in series to each other. The positive terminal of the semiconductor switching element S21 is connected to the positive terminal of the main power supply 10, and the negative terminal of the semiconductor switching element S22 is connected to the negative terminal of the main power supply 10.

On the other hand, the semiconductor switching element pair (S22, S21) on the right side are connected in series to each other. The positive terminal of the semiconductor switching element S22 is connected to the positive terminal of the main power supply 10, and the negative terminal of the semiconductor switching element S21 is connected to the negative terminal of the main power supply 10.

The semiconductor switching element pair (S21, S21) and the semiconductor switching element pair (S22, S22) are turned on and off alternately.

As shown in FIG. 13, an AC terminal d1 and an AC terminal d2 of the inverter 41 are connected to each other through a coil 44 of a transformer 43 having a winding ratio of 1:2, and an AC terminal e1 and an AC terminal e2 of the inverter 42 are connected to other through a coil 45 of the transformer 43.

The transformer 43, having a leakage inductance of a fixed value L, transmits the electric power temporarily accumulated in the leakage inductance L to the auxiliary power supply 40 or the main power supply 10 by high speed switching control of the inverters.

More specifically, in the motoring mode (when electric power is transmitted from the capacitor 46 to the main power supply 10), the inverter 41 assumes a leading phase with respect to the inverter 42. At the same time, the inverter 41 transmits electric power with a high voltage that is about twice as high as the voltage V1 to the main power supply 10 through the transformer 43.

In the regeneration mode (when electric power is transmitted from the main power supply 10 to the capacitor 46) the inverter 41 assumes a delay phase with respect to the inverter 42. At the same time, the main power supply 10 transfers electric power with a low voltage that is about a half of the voltage V0 to the capacitor 46 through the transformer 43.

Patent Document 1: Japanese Patent Application Laid-Open NO. 11-146566

DISCLOSURE OF THE INVENTION

Problems to be Solved by the Invention

The AC link bidirectional DC-DC converter 44 as described above can be made small in size and weight by AC driving of the iron core. The switching power loss can be reduced by performing turn-on switching when the voltage and current of the semiconductor switching elements are zero. This means that the problems of (3) and (4) can be solved.

In the case of the AC link bidirectional DC-DC converter 44, however, since the voltage V0 of the main power supply 10 is applied to the semiconductor switching elements S21, S21, S22, S22 of the inverter 42, each of the semiconductor switching elements of the inverter 42 is required to have a voltage rating of about 1200V to ensure safety.

Further, in the motoring mode, for example, electric current iD1 (with a peak value of about 600 A) from the positive terminal of the capacitor 46 flows to the negative terminal of the capacitor 46, passing through the semiconductor switching elements S1 and S1 (or S2 and S2) and the transformer 43. Therefore, the semiconductor switching elements of the inverter 41 and the transformer must be supplied with a current of about 600A. Since the circuit is bidirectional, the same applies for the regeneration mode. This means that the problems of (1) and (2) cannot be solved.

As described above, the hybrid power supply system 2 using the AC link bidirectional DC-DC converter 44 has more complicated circuit configuration but no advantage over the hybrid power supply system 1 using the bidirectional boosting chopper 31 shown in FIG. 12.

In view of the problems above, it is an object of the present invention to provide a small-size, light-weight, and low-cost AC link bidirectional DC-DC converter with a low voltage and current rating and low switching power loss. It is another object of the present invention to provide a hybrid power supply system and a hybrid vehicle employing such an AC link bidirectional DC-DC converter.

Means for Solving the Problem

In order to achieve the objects above, a first aspect of the invention provides an AC link bidirectional DC-DC converter having two voltage inverters whose DC terminals are connected each other in series in additive polarity, in which a plurality of AC terminals of each of the voltage inverters are connected to a transformer, and the two voltage inverters are AC-linked to each other via the transformer. The AC link bidirectional DC-DC converter is characterized in that an external voltage applied between the DC terminals of the AC link bidirectional DC-DC converter is divided by the voltage inverters.

A second aspect of the invention according to the first aspect is characterized in that the voltage divided by the voltage inverters is realized by connecting the positive DC terminal of one of the voltage inverters to the negative DC terminal of other voltage inverter.

When the first and second aspects of the invention are applied to a hybrid power supply system 3, as shown in FIG. 1, a voltage V0 of a main power supply 10 is divided by inverters 51 and 52 forming an AC link bidirectional DC-DC converter 54 since a positive DC terminal I1 of the inverter 51 and a negative DC terminal I2 of the inverter 52 are connected in series in additive polarity in the AC link bidirectional DC-DC converter 5.

A third aspect of the invention according to the first aspect or the second aspect is characterized in that a leakage inductance of the transformer is used for control of the voltage inverters.

A fourth aspect of the invention according to the third aspect is characterized in that the leakage inductance of the transformer is generated by adjusting a gap between a primary coil and a secondary coil of the transformer.

When the third aspect of the invention is applied to the hybrid power supply system 3, as shown in FIG. 1, the transformer 53 has a leakage inductance L, whereby a predetermined electric power can be accumulated in a leakage inductance (L/2) of a coil 57 and a leakage inductance (L/2) of a coil 58.

According to the fourth aspect of the invention, a leakage inductance as required can be set in the hybrid power supply system 3 by adjusting a gap between the coil 57 and the coil 58.

In the third and fourth aspects of the invention, it is obvious that an external inductance may be added instead of relying only on the leakage inductance.

A fifth aspect of the invention according to the first to fourth aspects is characterized in that a winding ratio of the transformer is determined according to a potential dividing ratio of the voltage inverters.

When the fifth aspect of the invention is applied to the hybrid power supply system 3, as shown in FIG. 1, the ratio between a voltage generated by the coil 57 and a voltage generated by the coil 58 can be set to 1:2, for example, by setting the winding ratio to 1:2.

A sixth aspect of the invention according to the first to fifth aspects is characterized in that control of the voltage inverters is performed by phase difference control.

According to the sixth aspect of the invention, the voltage-current pattern of the coil 57 and the voltage-current pattern of the coil 58 as shown in FIGS. 2 and 3 can be controlled rapidly and easily by using the phase difference control.

A seventh aspect of the invention according to the sixth aspect is characterizing by involving frequency control.

According to the seventh aspect of the invention, the voltage-current pattern of the coil 57 and the voltage-current pattern of the coil 58 as shown in FIGS. 2 and 3 can be controlled rapidly and easily by changing the frequency within a range not causing magnetic saturation of the transformer 53, in addition to the phase difference control.

An eighth aspect of the invention provides a hybrid power supply system, in which a main power supply of an engine generator is connected in parallel via an AC link bidirectional DC-DC converter to an energy accumulation device while polarities thereof being matched, and electric power from the main power supply drives an electrically driven device composed of an inverter and a motor. The hybrid power supply system is characterized in that: the AC link bidirectional DC-DC converter has two voltage inverters whose DC terminals are connected each other in series in additive polarity, in which a plurality of AC terminals of each of the voltage inverters are connected to a transformer, and the two voltage inverters are AC-linked to each other via the transformer; the energy accumulation device is connected in parallel between serial terminals of the voltage inverter on the negative DC terminal side of the AC link bidirectional DC-DC converter; and a voltage of the main power supply applied between the high voltage side DC terminals of the AC link bidirectional DC-DC converter is divided by the voltage inverters. Although, in FIG. 1, the energy accumulation device is connected to both the inverters 51 and 52, one of the inverters may be a low-capacity capacitor for absorbing surge.

According to the eighth aspect of the invention, as shown in FIG. 1, a positive DC terminal I1 of the inverter 51 and a negative DC terminal I2 of the inverter 52 are connected in series, AC terminals m1 and m2 of the inverter 51 are connected via the coil 57, and AC terminals n1 and n2 of the inverter 52 are connected via the coil 58. Therefore, the inverter 51 and the inverter 52 are AC-linked to each other, and the voltage of the main power supply 10 is divided by the inverter 51 and the inverter 52.

A ninth aspect of the invention according to the eighth aspect is characterized in that a leakage inductance of the transformer is used for control of the voltage inverters. It is obvious that an external inductance may be added instead of relaying only on the leakage inductance.

When the ninth aspect of the invention is applied to the hybrid power supply system 3, as shown in FIG. 1, the transformer 53 has a leakage inductance L, whereby a predetermined electric power can be accumulated in the leakage inductance (L/2) of the coil 57 and the leakage inductance (L/2) of the coil 58, respectively.

A tenth aspect of the invention according to the eighth or ninth aspect is characterized in that a winding ratio of the transformer is determined according to a potential dividing ratio of the voltage inverters.

When the tenth aspect of the invention is applied to the hybrid power supply system 3, as shown in FIG. 1, efficient operation is made possible by setting the winding ratio between the coil 57 and the coil 58 to 1:2 when, for example, the rated voltage ratio of the DC voltage V1 of the voltage inverter and the DC voltage V2 of the voltage inverter is 1:2.

An eleventh aspect of the invention according to the eighth to tenth aspects is characterized in that control of the voltage inverters is performed by phase difference control.

According to eleventh aspect of the invention, as shown in FIGS. 2 and 3, the voltage-current pattern of the coil 57 and the voltage-current pattern of the coil 58 can be controlled rapidly and easily by controlling the phase difference.

A twelfth aspect of the invention according to the eleventh aspect is characterized by involving frequency control.

According to the twelfth aspect of the invention, the voltage-current pattern of the coil 57 and the voltage-current pattern of the coil 58 can be controlled rapidly and easily by changing the frequency within a range not causing magnetic saturation of the transformer, in addition to the phase difference control.

A thirteenth aspect of the invention is characterized in that a hybrid power supply system according to the eighth to twelfth aspects is mounted on a hybrid vehicle.

According to the thirteenth aspect of the invention, as shown in FIG. 1 for example, the voltage of the main power supply 10 can be divided by the inverter 51 and the inverter 52 by using the hybrid power supply system 3 of the present invention. Further, the leakage inductance can be used to perform electric power transmission between the auxiliary power supply and the main power supply. Further, the winding ratio of the transformer 53 can be changed according to the operating voltage ratio between the inverter 51 and the inverter 52. Further, the voltage-current pattern of the coil 57 and the voltage-current pattern of the coil 58 can be controlled rapidly and easily by the phase difference control.

Effects of the Invention

When the first and eighth aspects of the invention are applied to the hybrid power supply system 3, as shown in FIG. 1, the voltage V0 of the main power supply 10 can be divided by the inverter 51 and the inverter 52, and hence the voltage rating of the semiconductor switching elements used in the inverters can be reduced. Further, when the first and eighth aspects of the invention are applied to the hybrid power supply system 3, electric current flowing through the capacitor 55 is divided between the inverter 51 and the inverter 52, and hence the current rating of the semiconductor switching elements used in the inverters can be reduced. The current reduction makes it possible to reduce the size and weight of the transformer 53, and to manufacture the transformer 53 at low cost.

Further, when the semiconductor switching elements of the inverter 51 and the inverter 52 are turned on, in most of the operating states, the turning on is conducted in a state where electric current flows through an antiparallel diode connected in antipolarity thereto. Therefore, the turning on can be performed easily under the condition of zero voltage switching (ZVS) and zero current switching (ZCS). As a result, the switching power loss can be reduced significantly without using any special means, and hence the transmission efficiency of the hybrid power supply system 3 can be improved.

According to the second and ninth aspects of the invention, as shown in FIG. 1, electric power transmission of the inverter 51 and the inverter 52 can be performed with the use of a leakage inductance, and the use of the leakage inductance makes it possible to perform bidirectional electric power control easily without adding any external inductance only by setting the leakage inductance inherently present in the transformer 53 to an appropriate value. It should be understood here that an external inductance may be added instead of relying only on the leakage inductance.

According to the third and tenth aspects of the invention, as shown in FIG. 1, the winding ratio of the transformer 53 can be determined according to a potential dividing ratio between the inverter 51 and the inverter 52. This makes it possible to change the voltage of the main power supply 10 and the range of voltage applicable to the capacitor 55 of the inverter 51 as required. Therefore, the capacitor 55 can be designed in consideration of the size and cost thereof.

According to the fourth and eleventh aspects of the invention, the voltage-current patterns as shown in FIGS. 2 and 3 can be controlled by means of phase difference control. Therefore, electric power transmission between the main power supply 10 and the capacitor 55 can be performed rapidly and easily by the AC link bidirectional DC-DC converter 64.

According to the fifth and twelfth aspects of the invention, the voltage-current pattern of the coil 57 and the voltage-current pattern of the coil 58 can be controlled rapidly and easily. Therefore, electric power transmission by the AC link bidirectional DC-DC converter can be performed rapidly and easily.

According to the thirteenth aspect of the invention, the hybrid power supply system mounted on a vehicle can be small in size and light in weight at a low cost. Further, the efficiency in use of electric power of the vehicle can be enhanced since the switching power loss is small.

BEST MODE FOR CARRYING OUT THE INVENTION

Embodiments of the present invention will be described with reference to the accompanying drawings.

Embodiment 1

FIG. 1 is a diagram for explaining a hybrid power supply system employing an AC link bidirectional DC-DC converter according to the present invention.

As shown in FIG. 1, a hybrid power supply system 3 is composed of a main power supply 10 and an auxiliary power supply 50.

The main power supply 10 is connected to the auxiliary power supply 50 through a positive line 14 and a negative line 15.

The auxiliary power supply 50 is composed of an AC link bidirectional DC-DC converter 54 and a capacitor 55 (voltage V1) functioning as an energy accumulation device. The AC link bidirectional DC-DC converter 54 is composed of an inverter 51, an inverter 52, and a transformer 53. A condenser or the like may be used as an energy accumulation device in place of the capacitor 55.

The inverter 51 comprises four semiconductor switching elements S1, S1, S2, S2. The semiconductor switching elements are each formed by an IGBT and an antiparallel diode. The semiconductor switching element pair (S1, S2) located on the left side in the figure and the semiconductor switching element pair (S2, S1) located on the right side are connected in series, respectively.

The inverter 52 comprises four semiconductor switching elements S21, S21, S22, S22. The semiconductor switching elements are each formed by an IGBT and an antiparallel diode. The semiconductor switching element pair (S21, S22) located on the left side of the figure and the semiconductor switching element pair (S22, S21) located on the right side are connected in series, respectively.

Unlike the AC link bidirectional DC-DC converter 44 shown in FIG. 13, the inverters 51 and 52 are connected in series such that a positive DC terminal I1 of the inverter 51 and a negative DC terminal I2 of the inverter 52 are in additive polarity.

The positive DC terminal I1 of the inverter 51 is connected to the positive terminal of the capacitor 55. The negative terminal n of the inverter 51 is connected to the negative terminal of the capacitor 55. This means that the inverter 51 and the capacitor 55 are connected in parallel while polarities thereof being matched.

The positive terminal p of the inverter 52 is connected to the positive line 14. The negative terminal n of the inverter 51 is connected to the negative line 15. This means that the AC link bidirectional DC-DC converter 54 is connected to the main power supply 10 in parallel while polarities thereof being matched.

The semiconductor switching element pair (S1, S1) and the semiconductor switching element pair (S2, S2) are turned on and off alternately. The semiconductor switching element pair (S1, S1) and the semiconductor switching element pair (S2, S2) will hereafter be referred to as the S1 arm and the S2 arm, respectively.

The semiconductor switching element pair (S21, S21) and the semiconductor switching element pair (S22, S22) are turned on and off alternately. The semiconductor switching element pair (S21, S21) and the semiconductor switching element pair (S22, S22) will hereafter be referred to as the S21 arm and the S22 arm, respectively.

The capacitor 56 (voltage V2), which is connected to the inverter 52 in parallel in FIG. 1, may be a low-capacity capacitor for absorbing surge.

An AC terminal m1 and an AC terminal m2 of the inverter 51 are connected to each other via a coil 57 of the transformer 53. An AC terminal n1 and an AC terminal n2 of the inverter 52 are connected to each other via a coil 58 of the transformer 53. When inverter 51 and the inverter 52 have a substantially same rated DC voltage, the winding ratio between the coil 57 and the coil 58 is preferably set to 1:1 as will be described later. However, this winding ratio may be changed as required.

The transformer 53 has a leakage inductance of a fixed value L (in the figure, the leakage inductance L is divided into L/2 on the coil 57 side and L/2 on the coil 58 side). Electric power temporarily accumulated in the leakage inductance is transmitted to the auxiliary power supply 50 or the main power supply 10 with the use of high speed switching control of the inverters.

It is known that a transformer generally increases its leakage inductance as a gap between a primary coil (the coil 57) and a secondary coil (the coil 58) is enlarged. Therefore, the primary coil and the secondary coil are usually formed close to each other. According to the present invention, the leakage inductance required by the circuit of the present invention is positively generated by adjusting the gap between the primary coil and the secondary coil.

It is obvious that inductance may be added externally instead of depending only on the leakage inductance. This applies also for other embodiments.

In FIG. 1, voltages generated in the coils 57 and 58 are defined as coil voltages v1 and v2, respectively, and electric currents flowing through the coils 57 and 58 are defined as coil currents i1 and i2, respectively. When the coil 57 and the coil 58 have a same winding ratio and the excitation current is neglected, the current i1 and the current i2 have a same magnitude in the action of the transformer 53. If the current i1 flows into the start point of winding of the coil 57 (indicated by the black circle), the current i2 flows out from the start point of winding of the coil 58 (indicated by the black circle) to cancel the magnetic flux generated by the current i1.

Operation of the hybrid power supply system 3 having the configuration above will be described in terms of a case in which the transformer 53 has a winding ratio of 1:1.

(Motoring Mode)

FIGS. 2A to 2D are diagrams showing variation in voltage and current when the AC link bidirectional DC-DC converter 54 is operated in the motoring mode under heavy load. The horizontal axis represents a common time axis.

Operation patterns shown in FIGS. 2A to 2D will be described sequentially.

FIG. 2A is a diagram showing variation in voltage v1 of the coil 57 according to turning on and off of the S1 arm and the S2 arm of the inverter 51. The vertical axis represents voltage value. In FIG. 2A, the time at which the S1 arm is turned on for the first time is set as t=0.

The S1 arm and the S2 arm are repeatedly turned on and off alternately with a cycle time 2T. When the S1 arm is on, the voltage v1 becomes voltage V1, whereas when the S2 arm is on, the voltage v1 becomes voltage −V1. The period from time t=0 to time T is referred to as first half cycle time, and the period from time T to time 2T is referred to as last half cycle time. This voltage waveform is periodically repeated thereafter.

FIG. 2B is a diagram showing variation in voltage v2 of the coil 58 according to turning on and off of the S21 arm and the S22 arm of the inverter 52. The vertical axis represents voltage value.

To establish the motoring mode, the S21 arm and the S22 arm are repeatedly turned on and off alternately with a cycle time 2T while being delayed for a predetermined time T1 with respect to the S1 and S2 arms. When the S21 arm is on, the voltage v2 becomes voltage V2, whereas when the S22 arm is on, the voltage v2 becomes voltage −V2. This voltage waveform is periodically repeated thereafter.

FIG. 2C is a diagram showing variation in coil current i1 when the voltage V1 is greater than the voltage V2. The vertical axis represents current value.

In FIG. 2C, when the coil voltage v1 is switched over from −V1 to V1 at time t=0, the leakage inductance voltage is applied to the positive terminal such that the voltage V1 and the voltage V2 are cumulative by the action of the semiconductor switching elements. The coil current i1, which assumes a negative maximum current value −I1 at time t=0, rapidly increases to reach zero at time T2 and becomes coil current I2 at time T1.

When this is expressed by a mathematical expression, the coil current i1a from time t=0 to time T can be represented as follows.

$$i1a = -I1 + (V1+V2)t/L \quad (1)$$

where L denotes a leakage inductance, and t denotes elapsed time. The current change rate is (V1+V2)/L. V1+V2=V0, and the coil current i1 rises more rapidly as the voltage of the main power supply 10 is higher.

When the S21 arm is then turned on at time T1, the voltage V1 and the voltage V2 are applied differentially to the positive terminal by the action of the semiconductor switching elements. Therefore, the coil current i1 increases although the current change rate of the coil current i1 is reduced. The coil current i1 assumes a positive maximum current value I1 at time T.

When this is expressed by a mathematical expression, the coil current i1b from time t=0 to time T can be represented as follows.

$$i1b = I2 + (V1-V2)(t-T1)/L \quad (2)$$

The current change rate is (V1−V2)/L, and the current change rate of i1b is positive since V1>V2. This is the variation in current in the first half cycle time.

When the S2 arm is turned on at time T, the coil voltage v1 is reversed to −V1 and the last half cycle time starts.

In the last half cycle time, the coil current i1 changes from a positive maximum value I1 to a negative maximum value −I1. When the coil voltage v1 is switched over from V1 to −V1 at time t=T, the coil current i1, which assumes the positive maximum current value I1 at time T, drops rapidly with the lapse of time to reach zero at time T3. The coil current then becomes −I2 at time T+T1. The current change rate at this time is −(V1+V2)/L.

When the S22 arm is then turned on at time T+T1, the voltage V1 and the voltage V2 are applied differentially to the negative terminal by the action of the semiconductor switching elements. Therefore, the coil current i1 drops although the current change rate of the coil current i1 is reduced. The coil current i1 assumes a negative maximum current value −I1 at time 2T. The current change rate at this time is −(V1−V2)/L. This is the variation in current in the last half cycle time.

The current pattern in the first half cycle time is antisymmetrical to the current pattern in the last half cycle time. These current patterns are repeated periodically thereafter.

Actual motoring energy in the first half cycle time can be obtained by integrating the product of the coil current i1 and the voltage V1 from time t=0 to time T. More specifically, in FIG. 2C, the actual motoring energy corresponds to the product of the voltage V1 (fixed value) and a difference between the area of the region of positive current values and the area of the region of negative current values.

Actual motoring energy in the last half cycle time assumes a same value as the actual motoring energy in the first half cycle time since the voltage and current patterns are antisymmetrical. This means that, in one cycle time, energy corresponding to twice the motoring electric power in the first half cycle time is transmitted from the auxiliary power supply 50 to the main power supply 10. The transmitted electric power is obtained by averaging this energy over the time T.

FIG. 2D is a diagram showing variation in the coil current i1 when the voltage V1 is smaller than the voltage V2.

In FIG. 2D, the coil voltage v1 is switched over from −V1 to V1 at time t=0, whereby the negative coil current −I1 is increased with time to reach zero at time T4. The coil current becomes coil current I2 at time T1. The current change rate is (V1+V2)/L.

When the S21 arm is then turned on at time T1, the coil current i1 goes down at a negative current change rate of (V1−V2)/L till the time T. The coil current i1 becomes a positive value I1 at time T. This is the variation in current in the first half cycle time T.

At time T, the S2 arm is turned on and the coil voltage v1 is reversed from V1 to −V1, and the last half cycle time starts.

In the last half cycle time, the coil current i1 changes from the positive value I1, via a negative maximum value −I2, to the negative value −I1. Since the current pattern in the last half cycle time is basically the same as that of FIG. 2C, description thereof will be omitted. Actual motoring electric power in one cycle time can be calculated in the same manner as described in FIG. 2C.

(Regeneration Mode)

In the hybrid power supply system 3, the inverter 51 and the inverter 52 are symmetrical to each other in terms of circuit configuration. Therefore, the hybrid power supply system 3 can be shifted from the motoring mode to the regeneration mode, only by exchanging the functions of the inverter 51 and the inverter 52.

FIGS. 3A to 3D are diagrams showing variation in voltage and current when the AC link bidirectional DC-DC converter 54 is operated in the regeneration mode under heavy load. The horizontal axis represents a common time axis.

FIG. 3A is a diagram showing variation in voltage v2 of the coil 58 according to turning on and off of the S21 arm and the S22 arm of the inverter 52. The vertical axis represents voltage value.

The S21 arm and the S22 arm are repeatedly turned on and off alternately with a cycle time 2T. In the figure, the time when the S21 arm is turned on for the first time is defined as t=0. When the S21 arm is on, the voltage v2 becomes voltage V2, whereas when the S22 arm is on, the voltage v2 becomes voltage −V2. This voltage waveform is repeated periodically thereafter.

FIG. 3B is a diagram showing variation in voltage v1 of the coil 57 according to turning on and off of the S1 arm and the S2 arm of the inverter 51. The vertical axis represents voltage value.

To establish the regeneration mode, the S1 arm and the S2 arm are repeatedly turned on and off with a cycle time 2T while being delayed for a predetermined time T1 with respect to the S21 arm and the S22 arm. When the S1 arm is on, the voltage v1 becomes voltage V1, and when the S2 arm is on the voltage v1 becomes voltage −V1. This voltage waveform is repeated periodically thereafter.

FIG. 3C is a diagram showing variation in coil current i2 when the voltage V2 is greater than the voltage V1. The vertical axis represents current value.

In FIG. 3C, the coil voltage v2 becomes from −V2 to V2 at time t=0. As a result, the coil current i2, which assumes a negative maximum current value −I1 at time t=0, rapidly increases to reach zero at time T2, and becomes coil current I2 at time T1. The current change rate is (V1+V2)/L.

When the S1 arm is then turned on at time T1, the coil current i2 continues to increase although the current change rate of the coil current i2 becomes lower. The coil current i2 assumes a positive maximum current value I1 at time T. The current change rate is (V2−V1)/L. This is the variation in current in the first half cycle time.

When the S22 arm is then turned on at time T, the coil voltage v2 is reversed from V2 to −V2, and the last half cycle time starts.

In the last half cycle time, the coil current i2 changes from a positive maximum value I1 to a negative maximum value −I1. Since the current pattern in the last half cycle time is antisymmetrical to that in the first half cycle time, description thereof will be omitted. This current pattern is repeated periodically thereafter.

Actual regeneration energy in the first half cycle time is obtained by integrating the product of the coil current i2 and the voltage V2 from the time t=0 to the time T. More specifically, in FIG. 2C, the actual regeneration energy corresponds to the product of the voltage V2 (fixed value) and a difference between the area of the region of positive current values and the area of the region of negative current values.

Since the current patterns are antisymmetrical, the actual regeneration energy in the last half cycle time assumes a same value as the actual regeneration energy in the first half cycle time. This means that, in one cycle time, energy corresponding to twice the regeneration energy in the first half cycle time is transmitted from the auxiliary power supply 50 to the main power supply 10. The transmitted electric power is obtained by averaging this energy over the time T.

FIG. 3D is a diagram showing variation in the coil current i2 when the voltage V2 is smaller than the voltage V1.

In FIG. 3D, the coil voltage v2 is switched over from −V2 to V2, whereby the coil current −I1 of a negative value increases rapidly with the lapse of time from time t=0 to reach zero at time T4. The coil current becomes coil current I2 at time T1. The current change rate is (V1+V2)/L.

When the S1 arm is then turned on at time T1, the coil current decreases till the time T. The current change rate is a negative value of (V2−V1)/L. The coil current i1 becomes a positive value I1 at time T. This is the variation in current in the first half cycle time T.

When the S2 arm is turned on at time T, the coil voltage v1 is reversed to −V1, and the last half cycle time starts.

In the last half cycle time, the coil current i1 changes from a positive value I1 to a negative value −I1. The voltage and current patterns in the last half cycle time are antisymmetrical to those in the first half cycle time. Therefore, description thereof will be omitted. Actual regenerated electric power in one cycle time can be calculated in the same manner as described in FIG. 3C.

As described above, the motoring and regenerating current patterns depend on parameters such as cycle time 2T, phase delay T, voltages V1 and V2, and leakage inductance L. The current pattern thus can be optimized by changing these parameters. When there is a phase difference of 90 degrees between the inverter 51 and the inverter 52, for example, maximum electric power can be transmitted.

The voltage waveform and current patterns as described above are controlled by changing the phase difference with the frequency fixed. However, in addition to the phase difference control, the transmission electric power also can be controlled by changing the frequency within a range not causing magnetic saturation of the transformer. This makes it possible to control the AC link bidirectional DC-DC converter rapidly and easily.

The problems (1) to (3) inherent to the prior art can be solved by using the AC link bidirectional DC-DC converter 54. This will be described below.

(Current Reduction)

In the hybrid power supply system 3 employing the AC link bidirectional DC-DC converter 54, electric current flowing from the capacitor 55 is divided by the inverter 51 and the inverter 52.

FIG. 4 is a diagram showing an example of electric current flow in the hybrid power supply system 3 in the motoring mode (the state in the period from time T1 to time T in FIG. 2). The solid lines represent current path, and the dotted lines represent blocked path.

As shown in FIG. 4, heavy current iD flowing from the capacitor 55 toward the AC link bidirectional DC-DC converter 54 is divided into two parts at a bridge connecting point I1, one to the inverter 51 side and the other to the inverter 52 side. Specifically, the IGBT of the S1 arm in the inverter 51 is on, and thus the current iD1 flows to the negative terminal side of the capacitor 55 via the coil 57. On the other hand, the diode of the S21 arm in the inverter 52 is on, and thus the current iD2 flows by way of the coil 58.

Due to the action of the transformer 53 having a winding ratio of 1:1, the current flowing through the both windings is equal to each other if the excitation current is neglected. Therefore, the current iD1 flowing through the inverter 51 is equal to the current iD2 flowing through the inverter 52. This means that, when the current iD flowing from the capacitor 55 is of 600 A, this current is divided between the inverter 51 and the inverter 52, which are each supplied with 300 A current.

On the other hand, in the regeneration mode, although current from the main power supply 10 enters the capacitor 55, only the current direction shown in FIG. 4 is changed since the IGBT of the S21 arm and the diode of the S2 arm are conductive in the period from time T1 to T in FIG. 3. This means that the divided current iD2 of the inverter 52 and the divided current iD1 of the inverter 51 join together at the connecting point I1, and the heavy current iD flows into the capacitor 55.

Due to the action of the transformer 53 having a winding ratio of 1:1, the current flowing through both the windings is equal to each other if the excitation current is neglected. Therefore, the current iD1 flowing through the inverter 51 is equal to the current iD2 flowing through the inverter 52. This means that, when the current flowing from the main power supply 10 is of 300 A, it is obvious that 300 A current flows through the inverter 52, while the current flowing through the inverter 51 is also of 300 A, and the capacitor 55 is supplied with 600 A current.

In the hybrid power supply system 3 according to the present invention as described above, the electric current flowing to the capacitor 55 is divided between the inverter 51 and the inverter 52. Therefore, the current rating for semiconductor switching elements in the inverters can be reduced to a half. Further, the current reduction makes it possible to reduce the size and weight of the transformer 53, and when the coil winding ratio is 1:1, the transformer 53 can be manufactured easily at a low cost.

(Voltage Reduction)

In the hybrid power supply system 3 employing the AC link bidirectional DC-DC converter 54, high voltage in the main power supply 10 is divided between the inverter 51 and the inverter 52.

In FIG. 1, the voltage applied to the inverter 51 is equal to the voltage V1 of the capacitor 55 connected to the DC positive terminal and negative terminal of the inverter 51. The voltage V2 applied to the inverter 52 is equal to potential difference between the DC negative terminal of the inverter 52 and the positive terminal of the main power supply 10, that is V2=VO−V1. When the potential difference of the inverter 51 is set to VO/2, for example, the potential difference of the inverter 52 is also VO/2. This is preferable since the voltage rating for the elements in the inverter 51 can be the same as the voltage rating for the elements in the inverter 52.

Although the a winding ratio between the coil 57 and the coil 58 of the transformer is set to 1:1 in the embodiment above, the coil winding ratio can be changed. This makes it possible to change the range of voltage applicable to the capacitor 55 of the inverter 51. When the winding ratio between the coil 57 and the coil 58 is set to 1:2, for example, the voltage ratio generated in the coil 57 and the oil 58 is 1:2. Accordingly, the voltage V1 of the capacitor 55 is preferably set to one third of the voltage of the main power supply 10. When the voltage V0 of the main power supply 10 is 600V, for example, the capacitor 55 can be operated at a low voltage of about 200V with the voltage rating of the inverter 51 being set to about 200V. Low-voltage capacitors have advantages of small size, light weight, and low cost. However, the rated voltage of the inverter 52 is rather high, about 400V.

In the hybrid power supply system 3 according to the present invention as described above, the voltage of the main power supply 10 can be divided between the inverter 51 and the inverter 52. Therefore, the voltage rating for the elements used in the inverters can be low. Further, the range of voltage applicable to the inverter 51 of the capacitor can be changed.

(Reduction of Switching Power Loss)

In the hybrid power supply system 3 employing the AC link bidirectional DC-DC converter 54, the semiconductor switching elements are turned on at zero voltage and zero current (soft switching).

Soft switching operation of the hybrid power supply system 3 will be described with reference to FIGS. 5 to 7.

FIG. 5 shows a current path in the hybrid power supply system 3 directly before time t=0. At this time, the S2 arm and the S22 arm are on (see FIGS. 2A and 2B). The solid lines represent a current path, and the dotted lines represent a blocked path.

The current iD from the capacitor 55 is divided at the connecting point I1, and the current iD1 flows to the inverter 51 while the current iD2 flows to the inverter 52.

FIG. 6 is a diagram showing a current path in the hybrid power supply system 3 in the period from time t=0 to time T2. In this period of time, the S1 arm and the S22 arm are on (see FIGS. 2A and 2B).

The IGBT of the S2 arm is turned off and the IGBT of the S1 arm is turned on at time t=0. But the current flowing to the leakage inductance of the transformer 53 is unable to change instantaneously and hence the current direction is not changed. Accordingly, the current is blocked by the S2 arm, and thus the current changes its direction to the antiparallel diode of the S1 arm. Accordingly, when the IGBT of the S1 arm is turned on, no current flows through the IGBT, while the antiparallel diode connected in parallel is conductive. Therefore, the voltage is clamped at a forward voltage drop of the diode, resulting in so-called zero voltage switching (ZVS) and zero current switching (ZCS), and thus no switching power loss occurs. The direct current iD1 of the inverter 51 assumes a negative value, having a same magnitude as the direct current iD2 of the inverter 52 in which the polarity is not changed. Therefore, no current flows through the capacitor 55 during this period of time.

Subsequently, the coil current i1 becomes zero at time T2 (see FIG. 2C), and the polarity of the coil current I1 is reversed, whereby electric current starts flowing through the IGBT of the S1 arm. Since the IGBT of the S1 arm has already been turned on at time t=0, no switching power loss occurs at this time. Similar operation is performed in the S22 arm.

FIG. 7 is a diagram showing a current path in the hybrid power supply system 3 after the IGBT of the S1 arm has been made conductive. Since the current polarity of the inverter 52 is also reversed, no current flows through capacitor 55 yet in this period of time. The IGBTs of the S1 and S22 arms are on till time T1. The S22 is turned off, while the S21 is turned on at time T1. At this time, the turn-on power loss is zero similarly to when the S1 is turned on, resulting in the state as shown in FIG. 4, and this state continues till time T.

The description above has been made of the soft switching operation of the S1 arm and the S2 arm in the period of time from time t=0 to time T. In the period of time from time T to time T+T1 shown in FIG. 2 as well, the soft switching described above is performed. Thereafter, the operation of the FIGS. 4 to 7 is repeated except for the difference between the first half cycle time and the last half cycle time.

In the hybrid power supply system 3 employing the leakage inductance as described above, the soft switching control can be performed easily without the use of an auxiliary circuit. This significantly reduces the switching power loss, and hence the transmission efficiency of the hybrid power supply system 3 can be improved.

Embodiment 2

FIG. 8 is a diagram showing an AC link bidirectional DC-DC converter in which two inverters are each formed by a half-bridge circuit. In FIG. 8, components designated with the same reference symbols as in FIG. 1 have same or similar functions as those in FIG. 1. For the convenience of description, the following description will be made in terms of an embodiment in which the AC link bidirectional DC-DC converter is incorporated in a hybrid power supply system.

As shown in FIG. 8, an AC link bidirectional DC-DC converter 64 is formed by an inverter 51 comprising semiconductor switching elements S1, S2 and an inverter 52 comprising semiconductor switching elements S21, S22.

In the AC link bidirectional DC-DC converter 64, a positive DC terminal I1 of the inverter 51 is connected in series to a negative DC terminal I2 of the inverter 52 in additive polarity. The inverter 51 is connected in parallel to a serially-connected pair of capacitors 55a and 55b while polarities thereof being matched. Likewise, the inverter 52 is connected in parallel to a serially-connected pair of capacitors 56a and 56b while polarities thereof being matched.

The voltage of the capacitor 55a and the capacitor 55b is V1/2, and the potential difference between the positive terminal and the negative terminal of the inverter 51 is V1. The voltage of the capacitor 56a and the capacitor 56b is V2/2, and the potential difference between the positive terminal and the negative terminal of the inverter 52 is V2. The positive terminal of the inverter 52 is connected to the positive terminal of a main power supply 10, and the negative terminal of the inverter 51 is connected to the negative terminal of the main power supply 10. This means that the AC link bidirectional DC-DC converter 64 is connected in parallel to the main power supply 10 while polarities thereof being matched.

AC terminals m1 and m2 of the inverter 51 are connected to each other via a coil 57 of a transformer 53, and AC terminals n1 and n2 of the inverter 52 are connected to each other via a coil 58 of the transformer 53. When the voltage V1 is substantially equal to the voltage V2, the winding ratio between the coil 57 and the coil 58 is preferably 1:1. The winding ratio may be adjusted according to a ratio between the voltage V1 and the voltage V2.

Using the AC link bidirectional DC-DC converter 64 configured as described above, same functions can be obtained as those of the AC link bidirectional DC-DC converter 54.

Embodiment 3

FIG. 9 is a diagram showing an AC link bidirectional DC-DC converter in which two inverters are formed by multiphase bridge connection. The following description will be made in terms of a three-phase bridge connection. Since the connection to the capacitor 55 and the main power supply 10 in this embodiment is basically same as that of Embodiment 1, the following description will be made only on different points from Embodiment 1.

In FIG. 9, the AC link bidirectional DC-DC converter 74 is formed by an inverter 51 comprising semiconductor switching elements S1, S2, S3, S4, S5, S6 and an inverter 52 comprising semiconductor switching elements S21, S22, S23, S24, S25, S26.

The inverter 51 has three pairs of semiconductor switching elements (S1, S2), (S3, S4), (S5, S6). Each pair of semiconductor switching elements is connected in series to each other and the three pairs are connected in parallel to each other. The inverter 52 has three pairs of semiconductor switching elements (S21, S22), (S23, S24), (S25, S26). Each pair is connected in series to each other and the three pairs are connected in parallel to each other.

In the AC link bidirectional DC-DC converter 74, a positive DC terminal I1 of the inverter 51 is connected in series to a negative DC terminal I2 of the inverter 52 in additive polarity.

AC terminals m1, m2 and m3 of the inverter 51 are connected via a coil 57 of a transformer 53, and AC terminals n1, n2 and n3 of the inverter 52 are connected via a coil 58 of the transformer 53. This makes it possible to establish three-phase AC link between the inverter 51 and the inverter 52.

The number of phases of the AC link may be increased by increasing the number of arms in the bridge.

Using the AC link bidirectional DC-DC converter 74 configured as described above, same functions can be obtained as those of the AC link bidirectional DC-DC converter 54.

Embodiment 4

FIG. 10 is a diagram illustrating an embodiment in which an AC link bidirectional DC-DC converter has two inverters which are AC-linked by a center-tapped transformer.

In FIG. 10, an AC link bidirectional DC-DC converter 84 is formed by an inverter 51 comprising semiconductor switching elements S1, S2 and an inverter 52 comprising semiconductor switching elements S21, S22.

The inverter 51 is designed such that the semiconductor switching elements S1, S2 are arranged in parallel while polarities thereof being matched. The inverter 52 is designed such that the semiconductor switching elements S21, S22 are arranged in parallel while polarities thereof being matched.

A positive terminal p1 of the semiconductor switching element S1 in the inverter 51 is connected to a coil terminal q1 of the transformer 73, and a positive terminal p2 of the semiconductor switching element S2 is connected to a coil terminal q2. A negative DC terminal p3 of the inverter 51 is connected to negative terminals of the capacitor 55 and main power supply 10. The positive terminal of the capacitor 55 is connected to a center tap z1 of a winding 77 of the transformer 73.

A negative terminal r1 of the semiconductor switching element S21 in the inverter 52 is connected to a coil terminal s1 of the transformer 73, and a negative terminal r2 of the semiconductor switching element S22 is connected to a coil terminal s2. A positive DC terminal r3 of the inverter 52 is connected to the positive terminal of the main power supply 10.

In FIG. 10, as described above, the center taps z1 and z2 of the coils 77 and 78 in the transformer 73 respectively correspond to I1 and I2 in the embodiments 1 to 3, and the inverter 51 and the inverter 52 are connected in series in additive polarity.

Using the AC link bidirectional DC-DC converter 74 configured as described above, the same functions can be obtained as those of the AC link bidirectional DC-DC converter 54.

These are the description of the AC link bidirectional DC-DC converters according to the present invention and the hybrid power supply systems using the same.

Although IGBTs are used for AC link bidirectional DC-DC converters in the embodiments described above, other high-speed semiconductor switching elements such as BJT, MOSFET, and GTO may be used instead.

The hybrid power supply according to the present invention is applicable to vehicles.

FIG. 11 shows a hybrid power supply system to which the hybrid power supply of the present invention is applied. Since the configuration is basically the same as that of the related art described in FIG. 12, description thereof will be omitted.

In a vehicle employing the hybrid power supply system of the present invention, the efficiency in use of electric power of the vehicle can be enhanced since the hybrid power supply system can be made small in size and light in weight at low cost, and the switching power loss is small.

INDUSTRIAL APPLICABILITY

The hybrid power supply system employing the AC link bidirectional DC-DC converter of the present invention is applicable to electrically powered devices which require a relatively large electric power as an electric power reversible boosting device.

Figure 1:
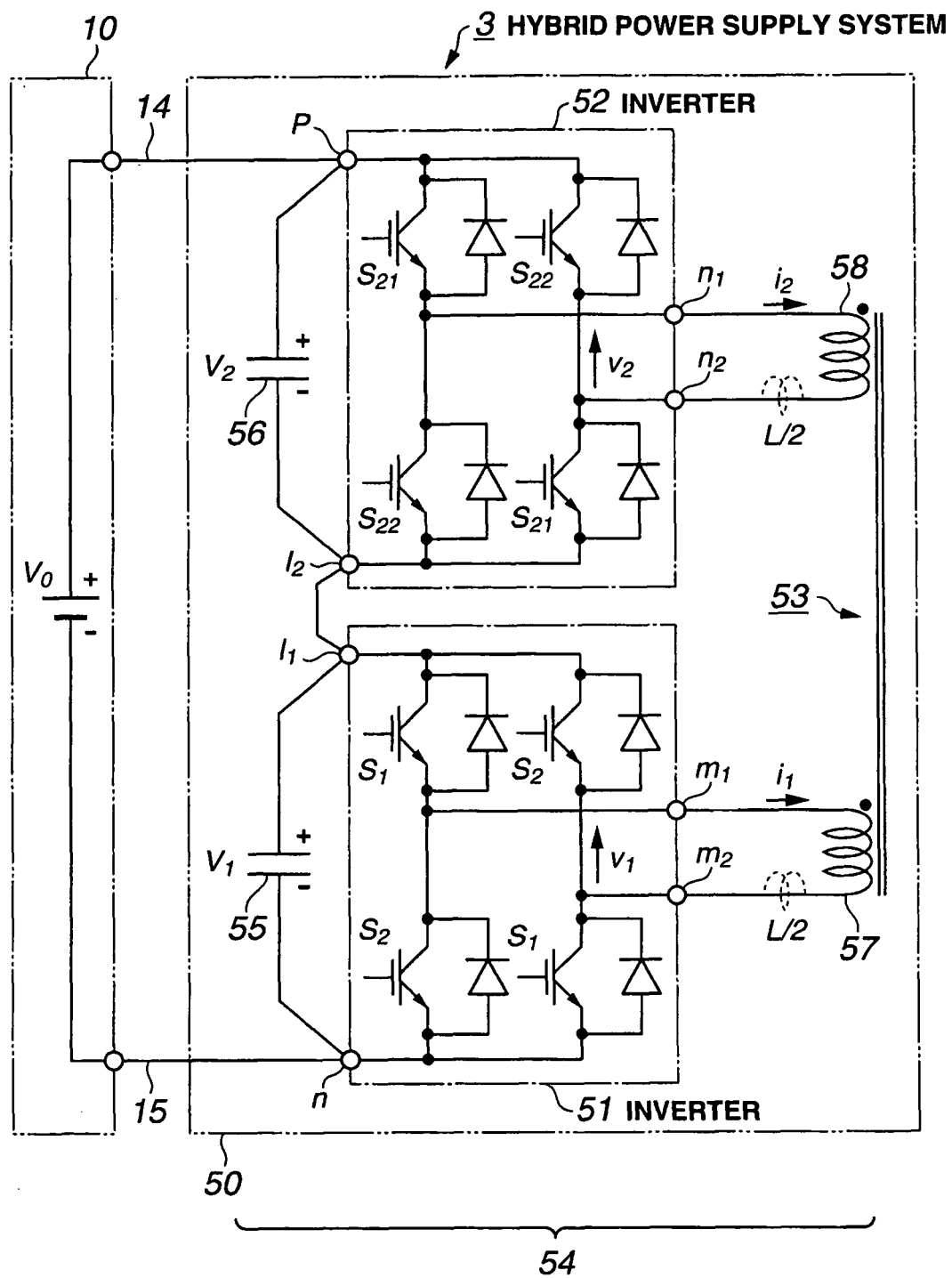
FIG. 1 is a diagram for explaining a hybrid power supply system employing an AC link bidirectional DC-DC converter according to the present invention.
Figure 2:
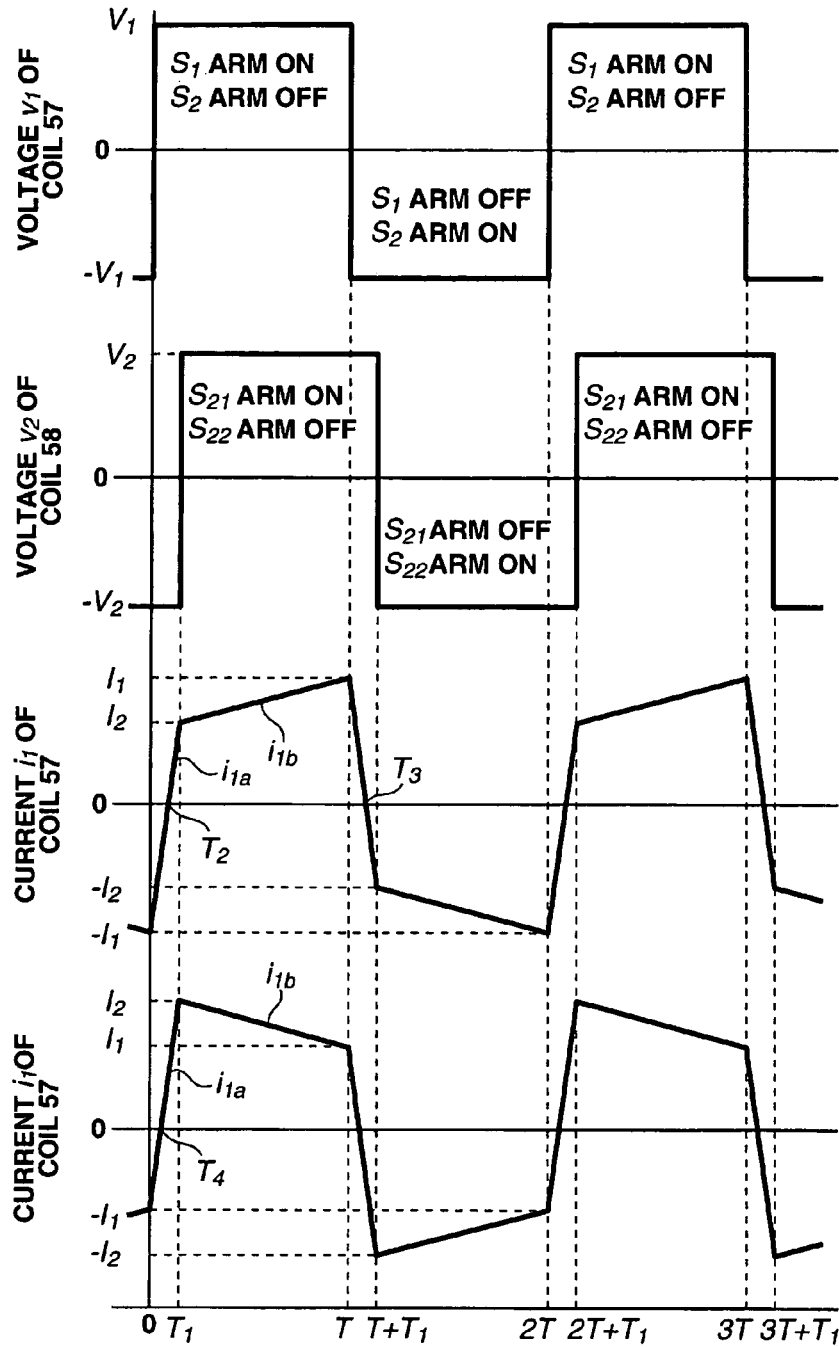
FIG. 2 is a diagram showing voltage and current operation of an AC link bidirectional DC-DC converter 54 in motoring mode.
Figure 3:
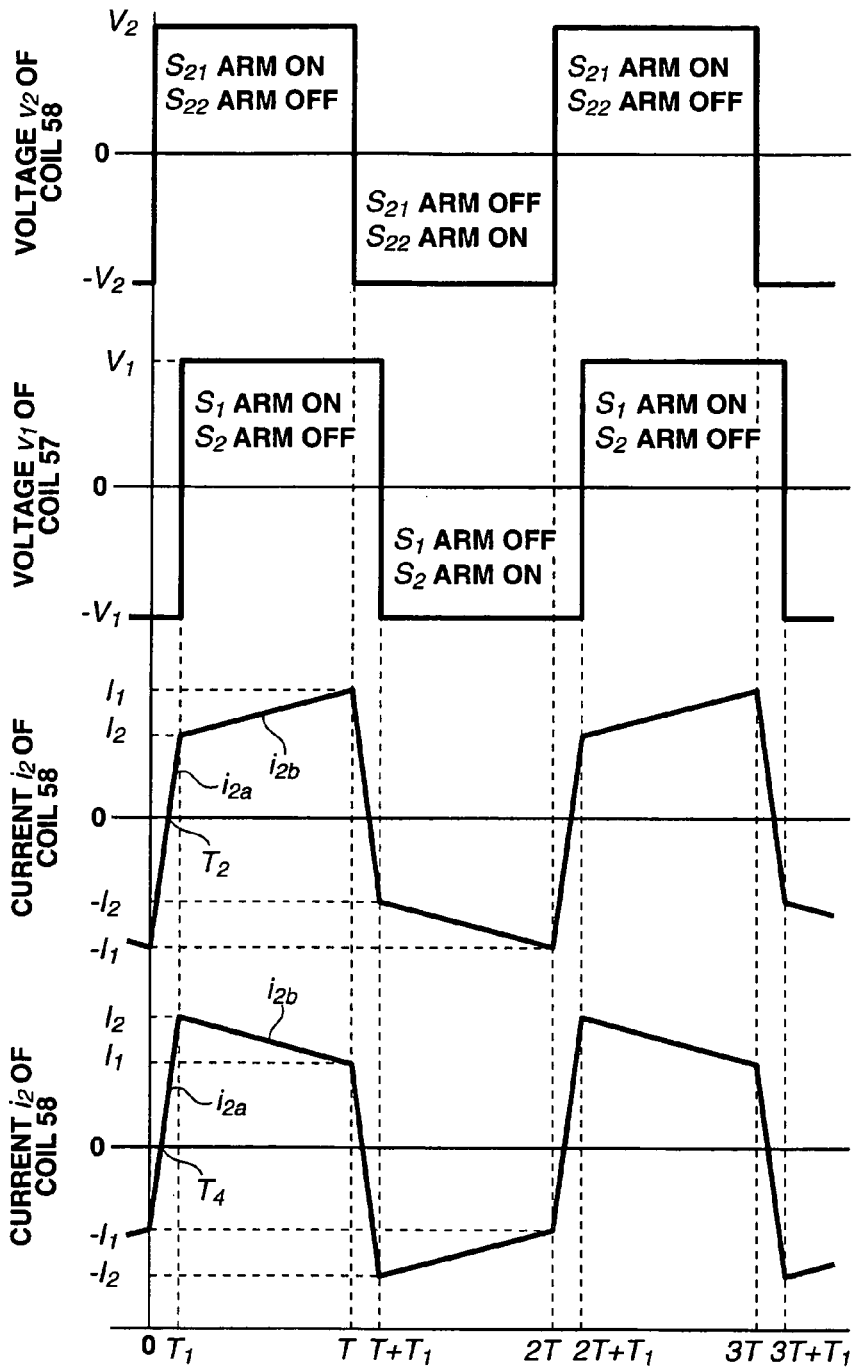
FIG. 3 is a diagram showing voltage and current operation of the AC link bidirectional DC-DC converter 54 in regeneration mode.
Figure 4:
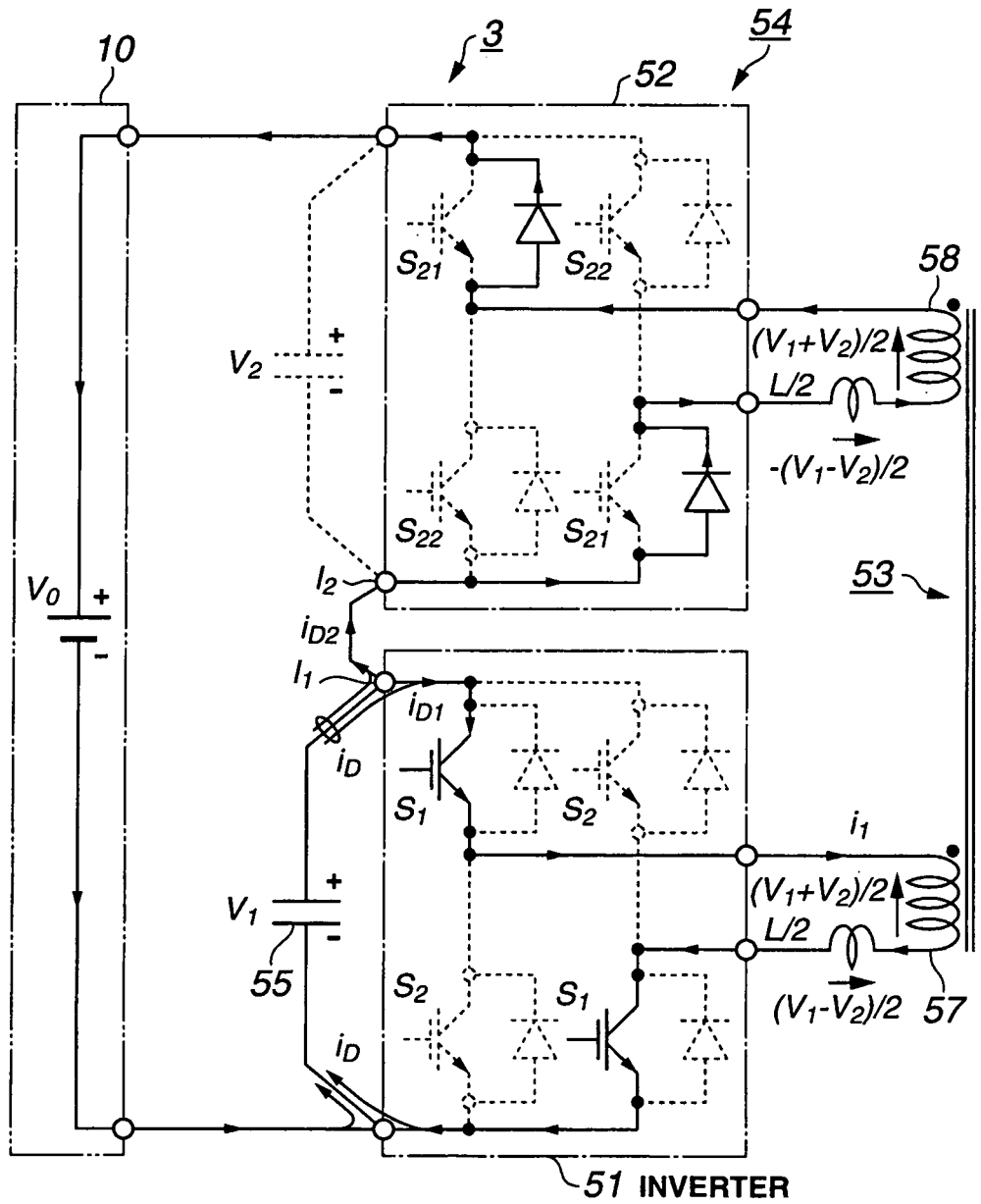
FIG. 4 is a current path diagram from time T1 to time T, showing an example of current flow in a hybrid power supply system 3 in motoring mode.
Figure 5:
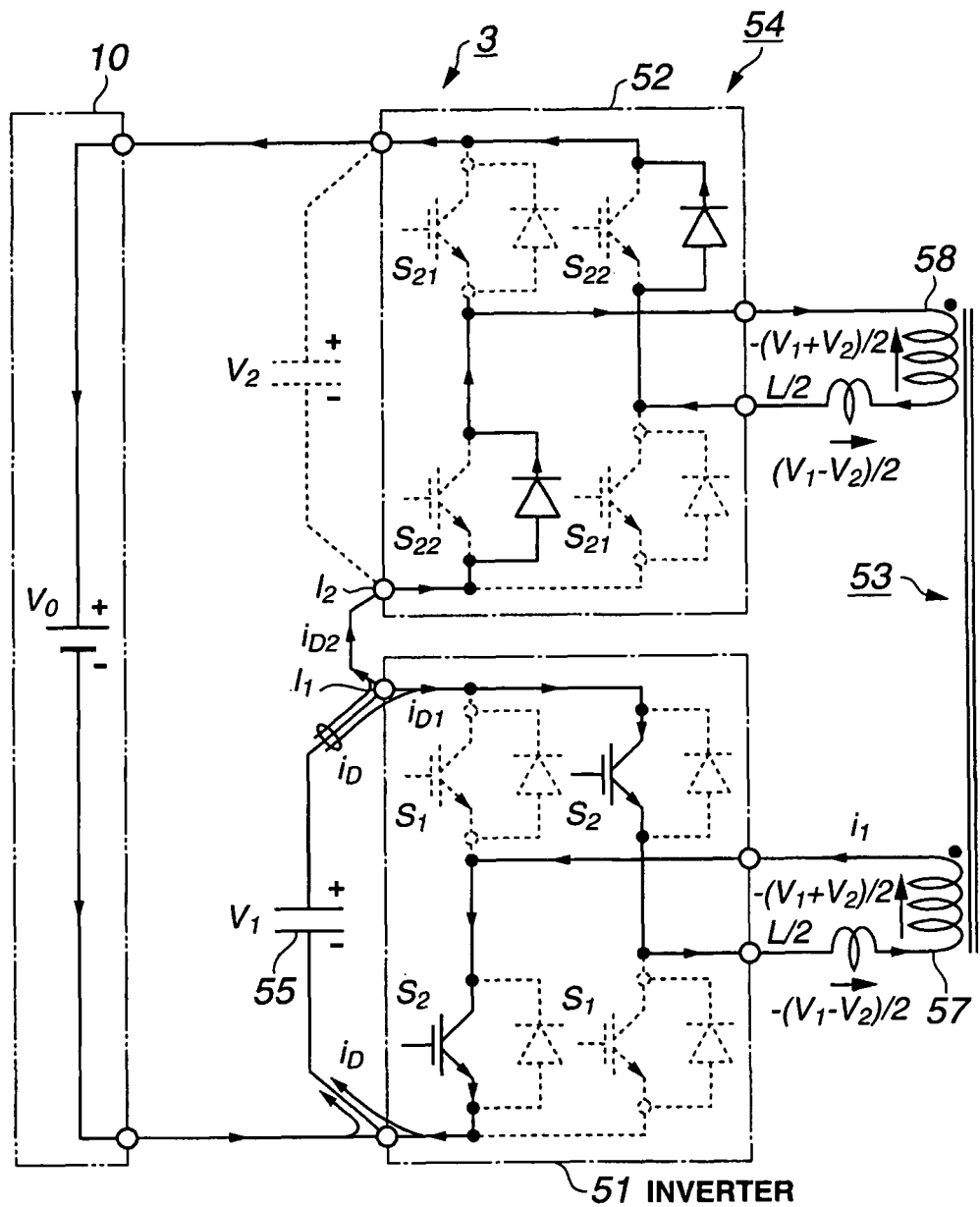
FIG. 5 shows a current path in the hybrid power supply system 3 directly before time t=0.
Figure 6:
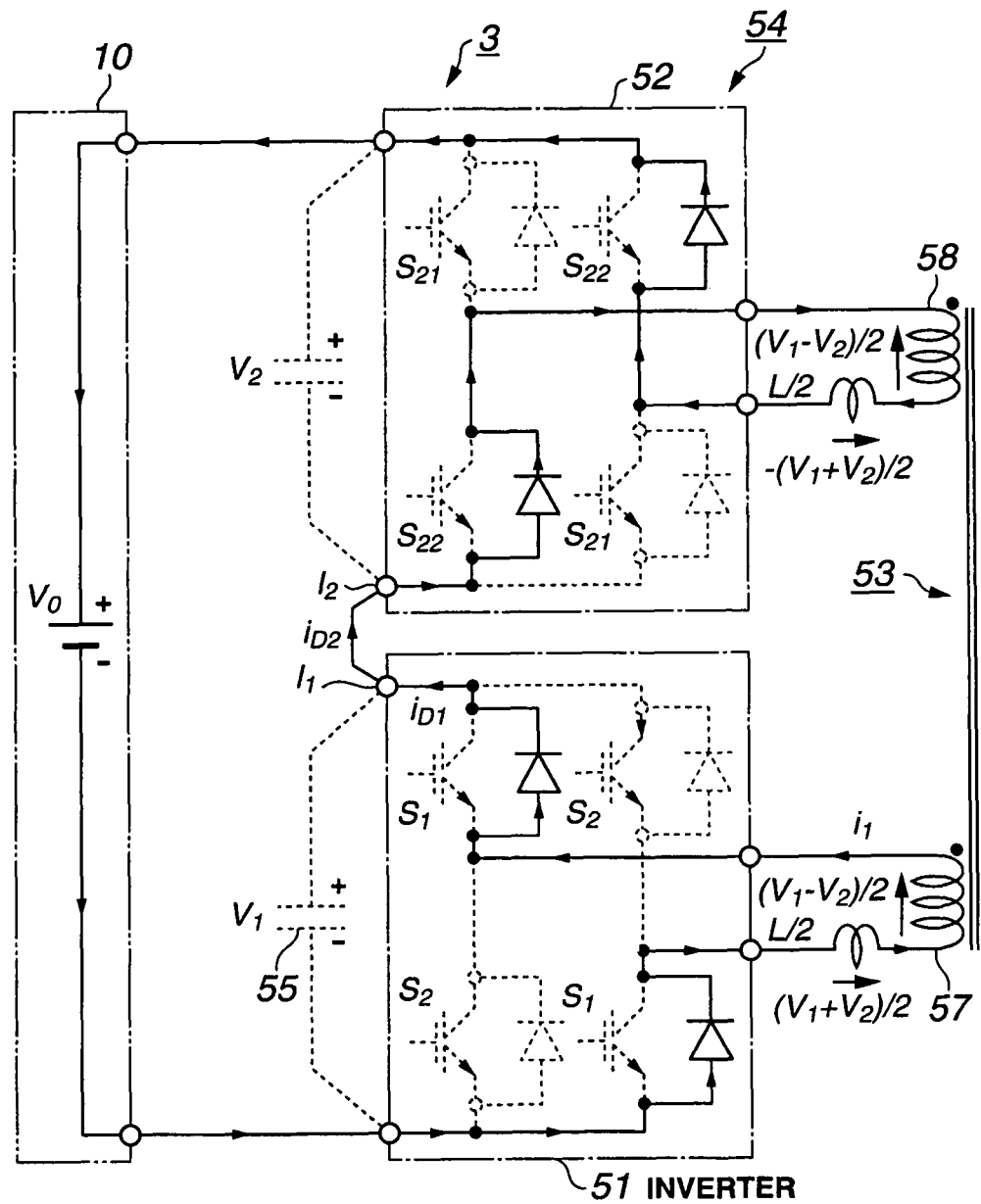
FIG. 6 is a diagram showing a current path in the hybrid power supply system 3 in a period of time from time t=0 to time T2.
Figure 7:
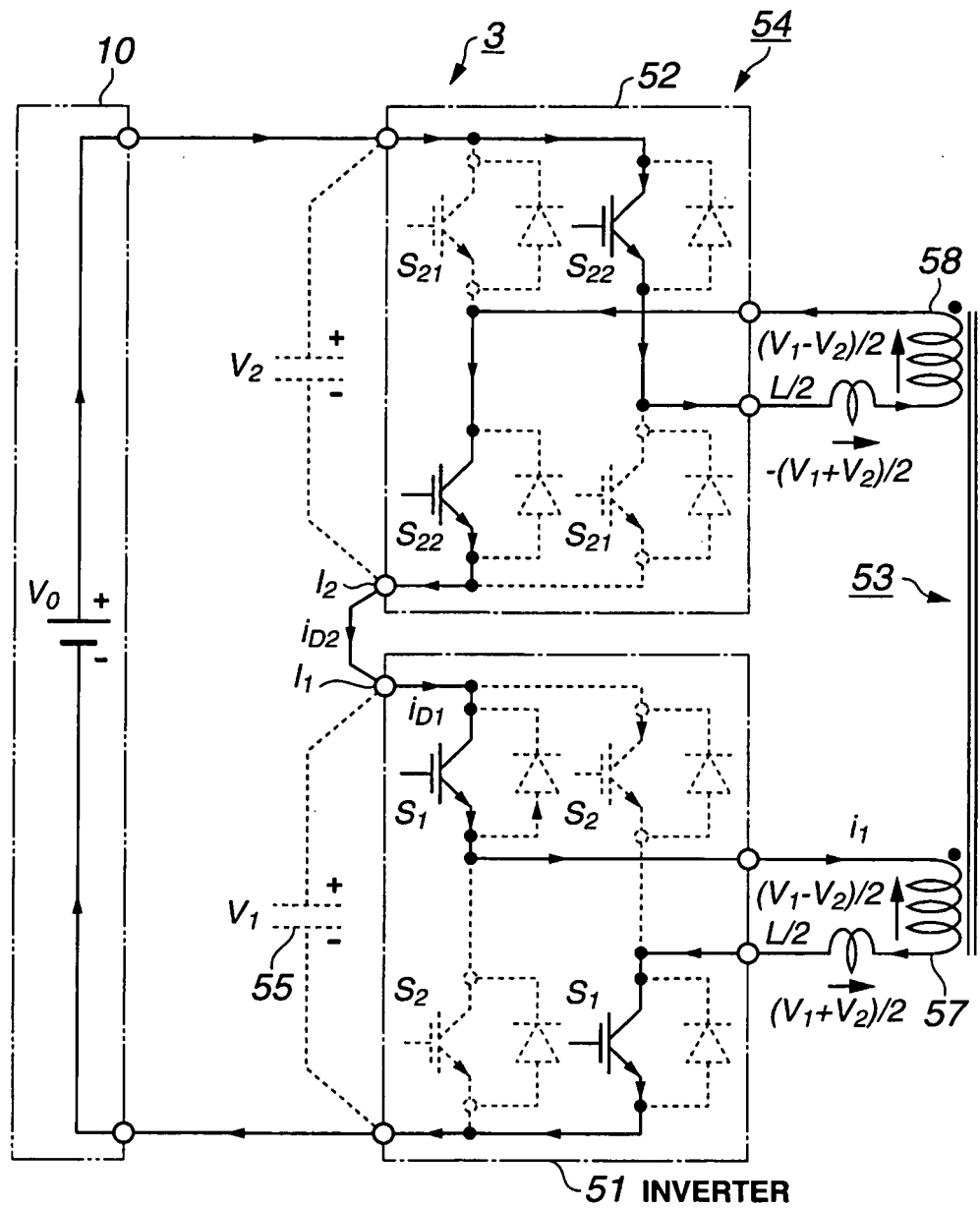
FIG. 7 is a diagram showing a current path in the hybrid power supply system 3 in a period of time from time T2 to time T1.
Figure 8:
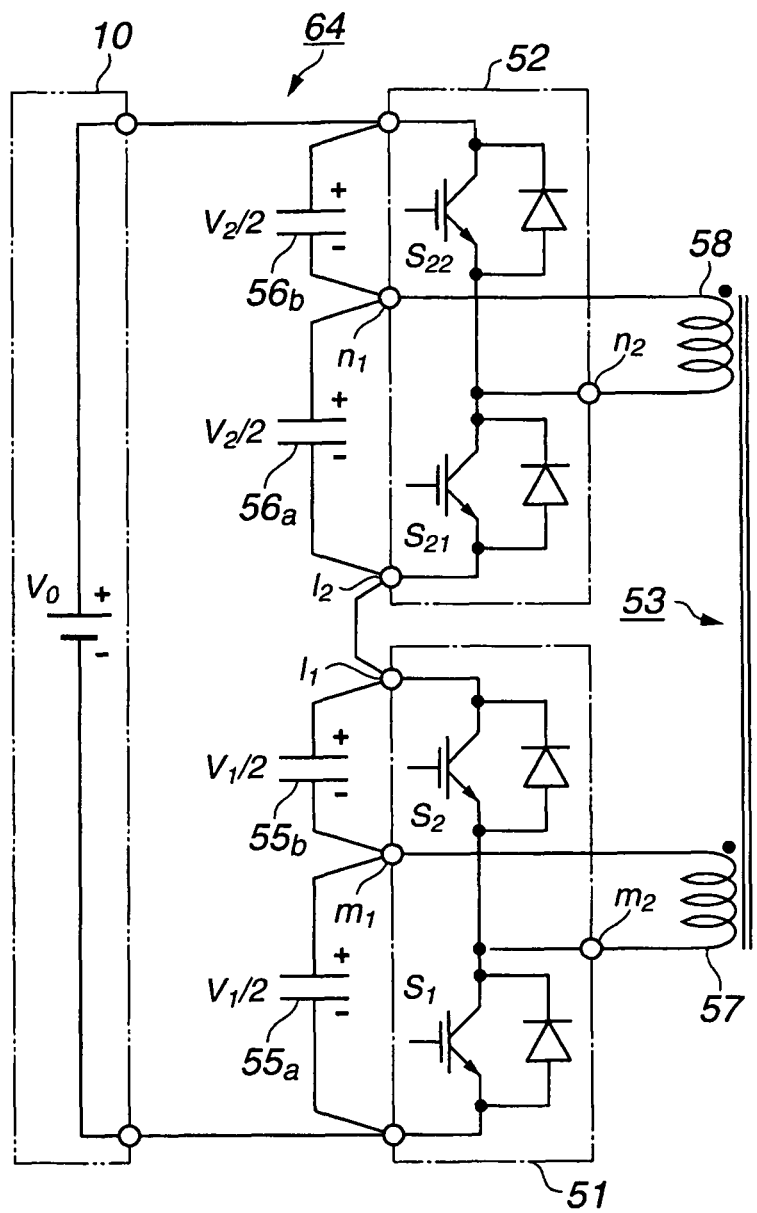
FIG. 8 is a diagram in which two inverters are each formed by a half-bridge circuit.
Figure 9:
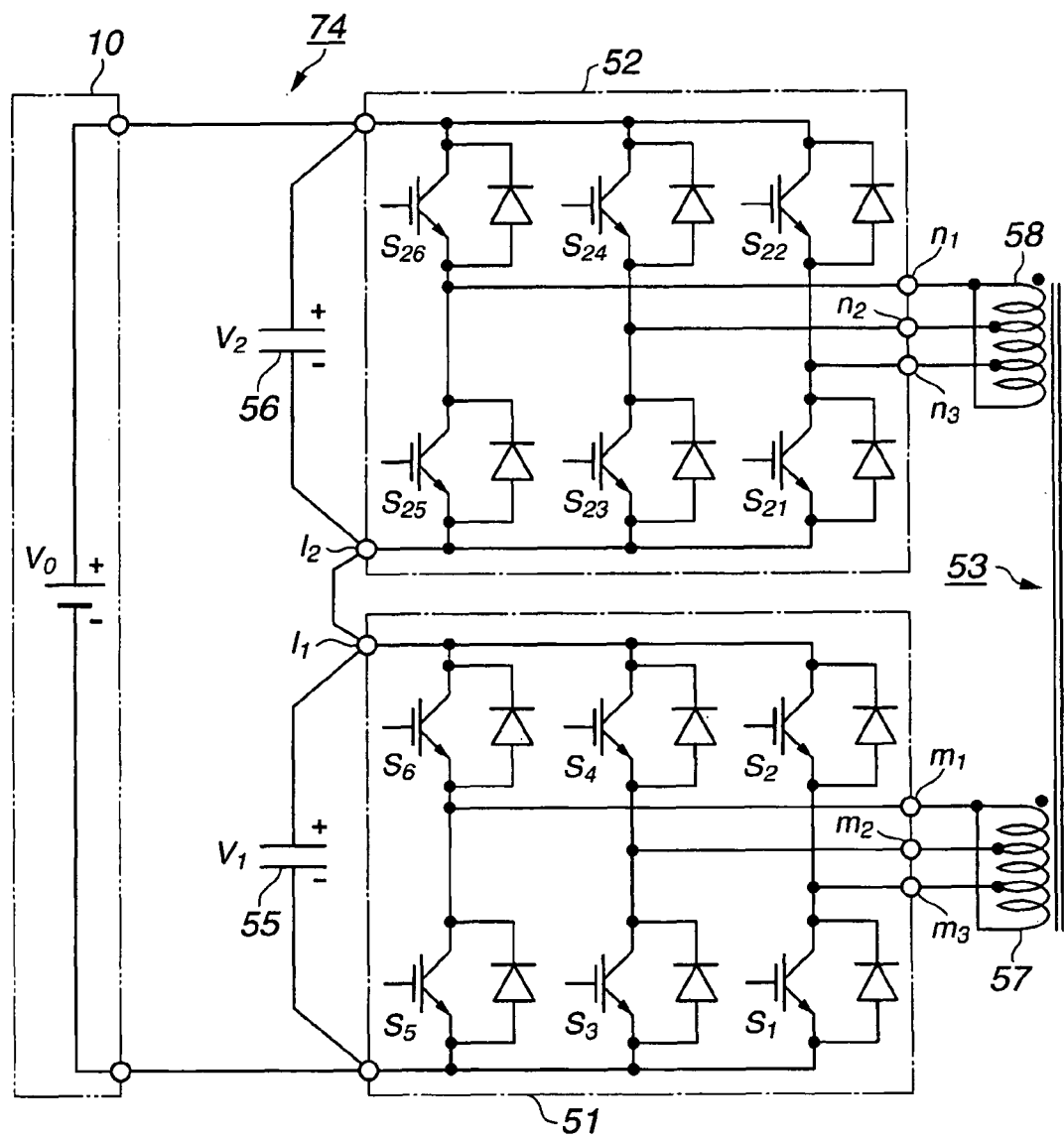
FIG. 9 is a diagram in which two inverters are each formed by a multiphase bridge circuit.
Figure 10:
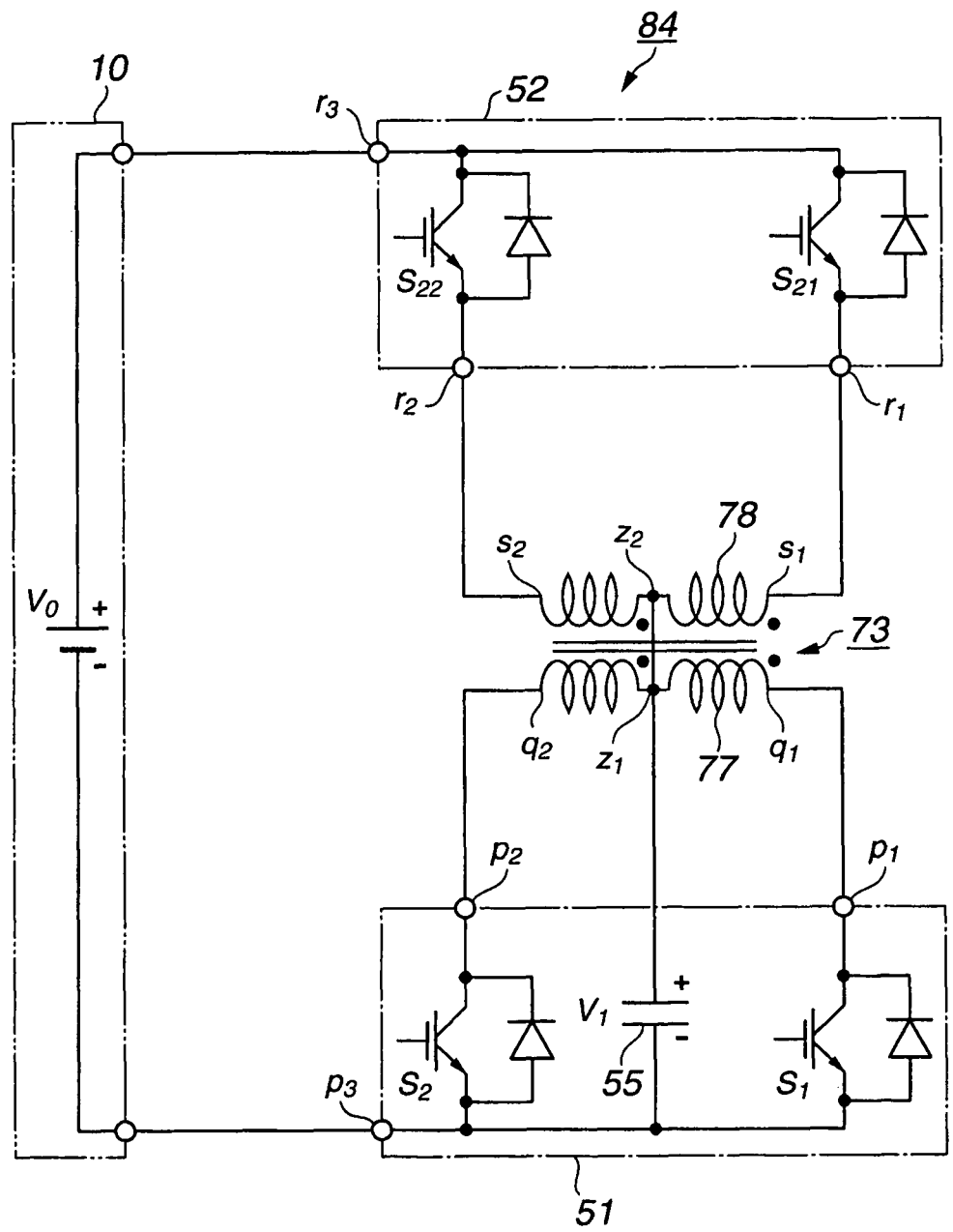
FIG. 10 is a diagram illustrating an embodiment in which two inverters are AC-linked by a center-tapped transformer.
Figure 11:
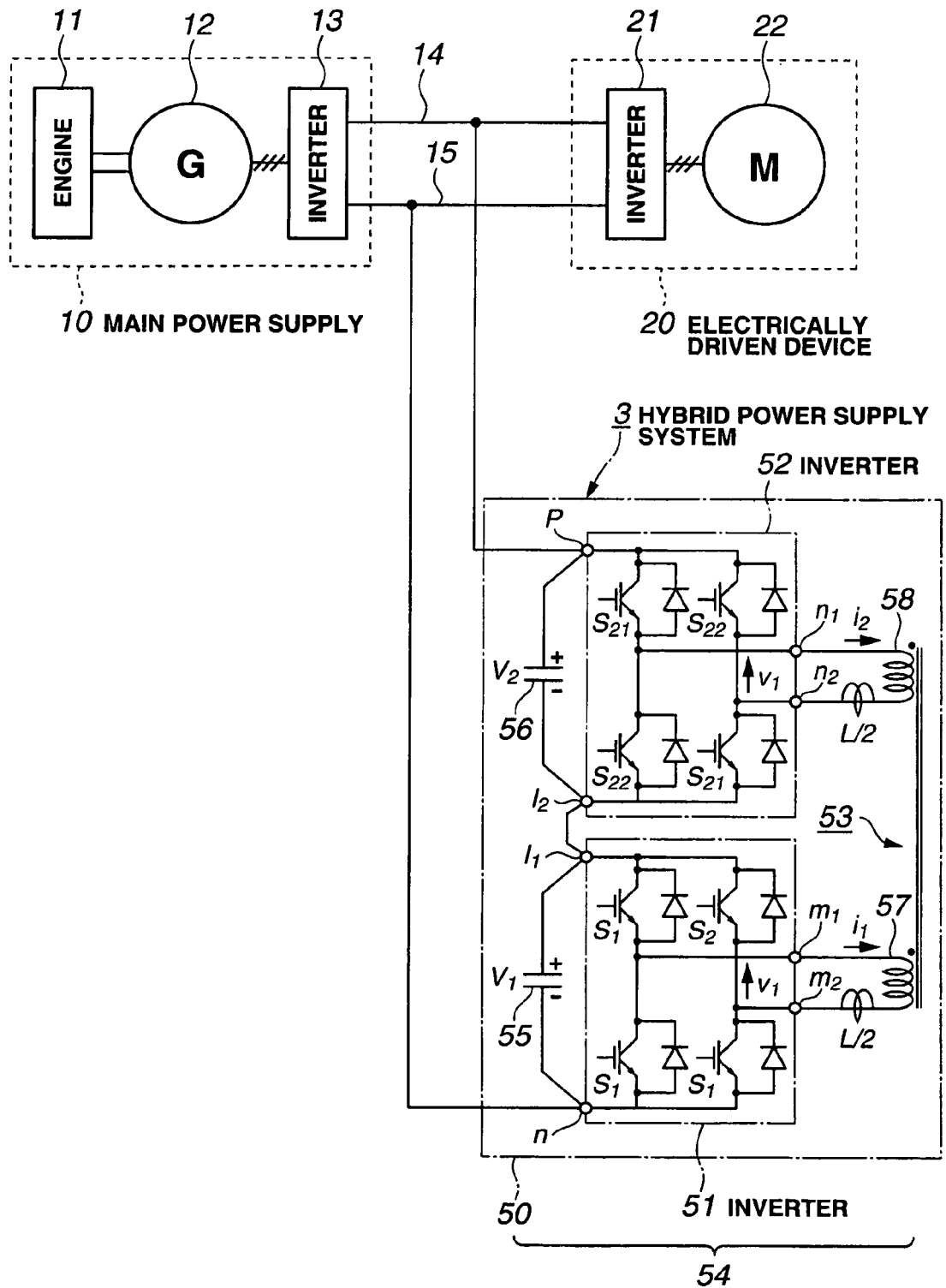
FIG. 11 a diagram showing a hybrid power supply system to which the hybrid power supply of the present invention is applied.
Figure 12:
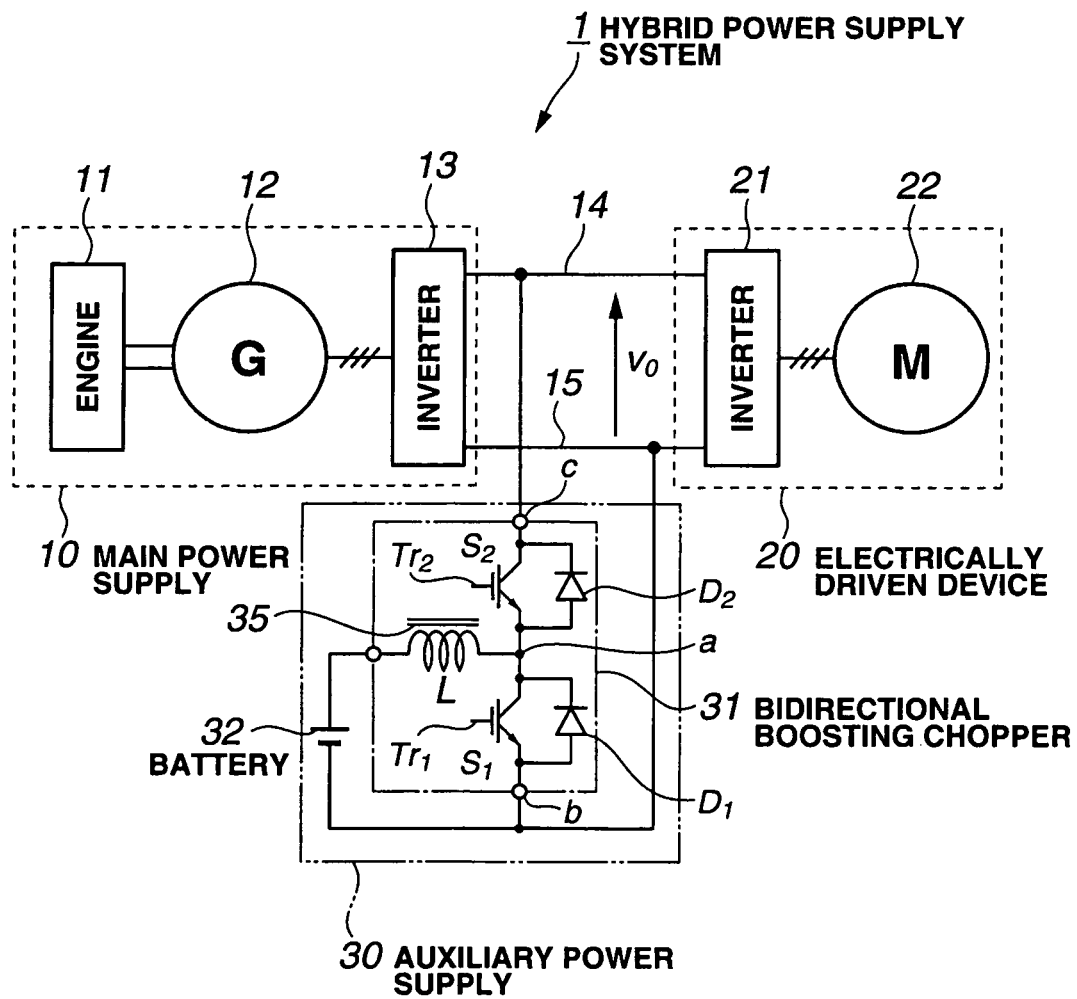
FIG. 12 is a diagram for explaining a typical hybrid power supply system for electric automobiles.
Figure 13:
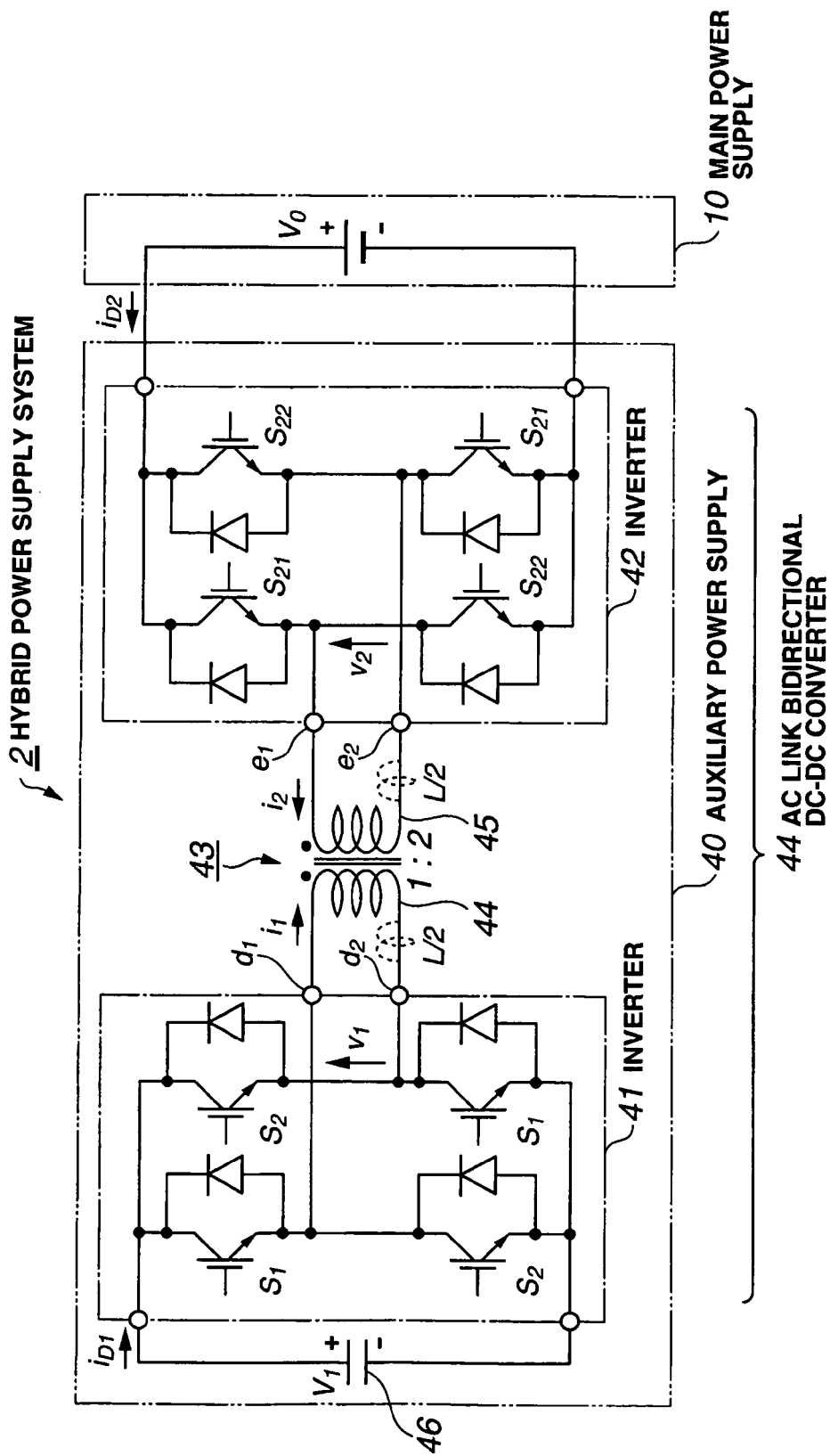
FIG. 13 is a diagram showing a hybrid power supply system employing an AC link bidirectional DC-DC converter.

The invention claimed is:

1. An AC link bidirectional DC-DC converter having two voltage inverters, each of said voltage inverters using semiconductor switching elements, each of said semiconductor switching elements being formed by an IGBT and an antiparallel diode, the voltage inverters having DC terminals connected to each other in series in additive polarity, a plurality of AC terminals of each of the voltage inverters being connected to a transformer, the two voltage inverters being AC-linked to each other through the transformer, by being configured such that, of the two voltage inverters, AC terminals of the voltage inverter on a negative DC terminal side are connected to a primary coil of the transformer and AC terminals of the voltage inverter on a positive DC terminal side are connected to a secondary coil of the transformer, that transmits and receives an electric power between an energy accumulation device and an external power supply, wherein:

the energy accumulation device is connected in parallel between a positive DC terminal and a negative DC terminal of the voltage inverter on the negative DC terminal side of the AC link bidirectional DC-DC converter, and an external voltage applied between the DC terminals of the AC link bidirectional DC-DC converter is divided by the voltage inverters, said converter being used to power hybrid vehicles.

2. The AC link bidirectional DC-DC converter according to claim 1, characterized in that the voltage divided by the voltage inverters is realized by connecting a positive DC terminal of one of the voltage inverters with a negative DC terminal of the other voltage inverter.

3. The AC link bidirectional DC-DC converter according to claim 1, characterized in that a leakage inductance of the transformer is used for control of the voltage inverters.

4. The AC link bidirectional DC-DC converter according to claim 2, characterized in that a leakage inductance of the transformer is used for control of the voltage inverters.

5. The AC link bidirectional DC-DC converter according to claim 3, characterized in that the leakage inductance of the transformer is generated by adjusting a gap between a primary coil and a secondary coil of the transformer.

6. The AC link bidirectional DC-DC converter according to claim 4, characterized in that the leakage inductance of the transformer is generated by adjusting a gap between a primary coil and a secondary coil of the transformer.

7. The AC link bidirectional DC-DC converter according to claim 1, characterized in that a winding ratio of the transformer is determined according to a potential dividing ratio of the voltage inverters.

8. The AC link bidirectional DC-DC converter according to claim 2, characterized in that a winding ratio of the transformer is determined according to a potential dividing ratio of the voltage inverters.

9. The AC link bidirectional DC-DC converter according to claim 3, characterized in that a winding ratio of the transformer is determined according to a potential dividing ratio of the voltage inverters.

10. The AC link bidirectional DC-DC converter according to claim 4, characterized in that a winding ratio of the transformer is determined according to a potential dividing ratio of the voltage inverters.

11. The AC link bidirectional DC-DC converter according to claim 5, characterized in that a winding ratio of the transformer is determined according to a potential dividing ratio of the voltage inverters.

12. The AC link bidirectional DC-DC converter according to claim 6, characterized in that a winding ratio of the transformer is determined according to a potential dividing ratio of the voltage inverters.

13. The AC link bidirectional DC-DC converter according to claim 1, characterized in that control of the voltage inverters is performed by phase difference control.

14. The AC link bidirectional DC-DC converter according to claim 2, characterized in that control of the voltage inverters is performed by phase difference control.

15. The AC link bidirectional DC-DC converter according to claim 3, characterized in that control of the voltage inverters is performed by phase difference control.

16. The AC link bidirectional DC-DC converter according to claim 4, characterized in that control of the voltage inverters is performed by phase difference control.

17. The AC link bidirectional DC-DC converter according to claim 5, characterized in that control of the voltage inverters is performed by phase difference control.

18. The AC link bidirectional DC-DC converter according to claim 6, characterized in that control of the voltage inverters is performed by phase difference control.

19. The AC link bidirectional DC-DC converter according to claim 7, characterized in that control of the voltage inverters is performed by phase difference control.

20. The AC link bidirectional DC-DC converter according to claim 8, characterized in that control of the voltage inverters is performed by phase difference control.

21. The AC link bidirectional DC-DC converter according to claim 9, characterized in that control of the voltage inverters is performed by phase difference control.

22. The AC link bidirectional DC-DC converter according to claim 10, characterized in that control of the voltage inverters is performed by phase difference control.

23. The AC link bidirectional DC-DC converter according to claim 11, characterized in that control of the voltage inverters is performed by phase difference control.

24. The AC link bidirectional DC-DC converter according to claim 12, characterized in that control of the voltage inverters is performed by phase difference control.

25. The AC link bidirectional DC-DC converter according to claim 13, characterized in that the control of the voltage inverters involves frequency control.

26. The AC link bidirectional DC-DC converter according to claim 14, characterized in that the control of the voltage inverters involves frequency control.

27. The AC link bidirectional DC-DC converter according to claim 15, characterized in that the control of the voltage inverters involves frequency control.

28. The AC link bidirectional DC-DC converter according to claim 16, characterized in that the control of the voltage inverters involves frequency control.

29. The AC link bidirectional DC-DC converter according to claim 17, characterized in that the control of the voltage inverters involves frequency control.

30. The AC link bidirectional DC-DC converter according to claim 18, characterized in that the control of the voltage inverters involves frequency control.

31. The AC link bidirectional DC-DC converter according to claim 19, characterized in that the control of the voltage inverters involves frequency control.

32. The AC link bidirectional DC-DC converter according to claim 20, characterized in that the control of the voltage inverters involves frequency control.

33. The AC link bidirectional DC-DC converter according to claim 21, characterized in that the control of the voltage inverters involves frequency control.

34. The AC link bidirectional DC-DC converter according to claim 22, characterized in that the control of the voltage inverters involves frequency control.

35. The AC link bidirectional DC-DC converter according to claim 23, characterized in that the control of the voltage inverters involves frequency control.

36. The AC link bidirectional DC-DC converter according to claim 24, characterized in that the control of the voltage inverters involves frequency control.

37. A hybrid power supply system, in which a main power supply of an engine electric generator is connected in parallel via an AC link bidirectional DC-DC converter to an energy accumulation device while polarities thereof being matched, and electric power from the main power supply drives an electrically driven device composed of an inverter and a motor, the hybrid power supply system being characterized in that:

the AC link bidirectional DC-DC converter has two voltage inverters, each of said voltage inverters using semiconductor switching elements, each of said semiconductor switching elements being formed by an IGBT and an antiparallel diode, the voltage inverters having DC terminals connected to each other in series in additive polarity;

a plurality of AC terminals of each of the voltage inverters are connected to a transformer;

the two voltage inverters are AC-linked to each other via the transformer by connecting, of the two voltage inverters, AC terminals of the voltage inverter on a negative DC terminal side to a primary coil of the transformer and by connecting AC terminals of the voltage inverter on a positive DC terminal side to a secondary coil of the transformer;

the energy accumulation device is connected in parallel between a positive DC terminal and a negative DC terminal of the voltage inverter on the negative DC terminal side of the AC link bidirectional DC-DC converter; and a voltage of the main power supply applied between high voltage side DC terminals of the AC link bidirectional DC-DC converter is divided by the voltage inverters, said system being used to power hybrid vehicles.

38. The hybrid power supply system according to claim 37, characterized in that a leakage inductance of the transformer is used for control of the voltage inverters.

39. The hybrid power supply system according to claim 37, characterized in that a winding ratio of the transformer is determined according to a potential dividing ratio of the voltage inverters.

40. The hybrid power supply system according to claim 38, characterized in that a winding ratio of the transformer is determined according to a potential dividing ratio of the voltage inverters.

41. The hybrid power supply system according to claim 37, characterized in that control of the voltage inverters is performed by phase difference control.

42. The hybrid power supply system according to claim 38, characterized in that control of the voltage inverters is performed by phase difference control.

43. The hybrid power supply system according to claim 39, characterized in that control of the voltage inverters is performed by phase difference control.

44. The hybrid power supply system according to claim 40, characterized in that control of the voltage inverters is performed by phase difference control.

45. The hybrid power supply system according to claim 41, characterized in that the control of the voltage inverters involves frequency control.

46. The hybrid power supply system according to claim 42, characterized in that the control of the voltage inverters involves frequency control.

47. The hybrid power supply system according to claim 43, characterized in that the control of the voltage inverters involves frequency control.

48. The hybrid power supply system according to claim 44, characterized in that the control of the voltage inverters involves frequency control.

\* \* \* \* \*